(12) United States Patent
DiCarlo et al.

(10) Patent No.: US 10,100,871 B2
(45) Date of Patent: Oct. 16, 2018

(54) BRIDGE MOUNT DEVICE AND SYSTEM

(71) Applicant: Robert J. McCreight, Jr., San Antonio, TX (US)

(72) Inventors: Joseph A. DiCarlo, Chester, NH (US); Robert J. McCreight, Jr., San Antonio, TX (US)

(73) Assignee: KNIGHTVISION, LLLP, Titusville, FL (US)

( * ) Notice: Subject to any disclaimer, the term of this patent is extended or adjusted under 35 U.S.C. 154(b) by 180 days.

(21) Appl. No.: 14/926,759

(22) Filed: Oct. 29, 2015

(65) Prior Publication Data

US 2016/0120296 A1    May 5, 2016

Related U.S. Application Data

(60) Provisional application No. 62/072,710, filed on Oct. 30, 2014, provisional application No. 62/153,245, filed on Apr. 27, 2015.

(51) Int. Cl.
| | |
|---|---|
| *A42B 3/04* | (2006.01) |
| *F16C 11/04* | (2006.01) |
| *F16C 11/10* | (2006.01) |
| *A45F 5/02* | (2006.01) |

(52) U.S. Cl.
CPC ............ *F16C 11/10* (2013.01); *F16C 11/045* (2013.01); *A45F 2005/025* (2013.01); *A45F 2200/0541* (2013.01); *Y10T 29/49826* (2015.01)

(58) Field of Classification Search
CPC .............. F16C 11/045; F16C 11/10; A45F 2200/0541; Y10T 29/49826; A42B 3/04

USPC .......... 29/428; 248/205.1, 214, 299.1, 309.1, 248/316.8, 320; 361/679.3; 359/819, 359/821–823

See application file for complete search history.

(56) References Cited

U.S. PATENT DOCUMENTS

| | | | |
|---|---|---|---|
| 4,449,787 A * | 5/1984 | Burbo | A42B 3/042 313/524 |
| 5,307,204 A | 4/1994 | Dor | |
| 5,331,459 A | 7/1994 | Dor | |
| 5,339,464 A | 8/1994 | Dor | |
| D358,830 S | 5/1995 | Dor | |
| 5,914,816 A | 6/1999 | Soto et al. | |
| 6,457,179 B1 | 10/2002 | Prendergast | |
| 6,472,776 B1 | 10/2002 | Soto et al. | |
| 6,667,832 B2 * | 12/2003 | Caplan | G02B 7/002 359/409 |
| 6,704,141 B1 * | 3/2004 | Nowak | G02B 7/002 359/411 |
| 6,751,810 B1 | 6/2004 | Prendergast | |
| 6,779,288 B1 | 8/2004 | Kim | |

(Continued)

OTHER PUBLICATIONS

International Preliminary Report on Patentability issued in application No. PCT/US2015/058201, dated May 2, 2017 (7 pgs).

*Primary Examiner* — Bayan Salone
(74) *Attorney, Agent, or Firm* — Hayes Soloway P.C.

(57) ABSTRACT

A bridge mount device, system, and related methods are disclosed. The bridge mount device has a mounting shoe. A connector is affixed to the mounting shoe. A bridge assembly has at least two bridge arms, wherein each of the bridge arms has an optical device mount. The at least two bridge arms are detachably connected to the connector. The mounting shoe is vertically offset from the bridge assembly and horizontally adjustable relative to the bridge assembly.

23 Claims, 38 Drawing Sheets

(56) References Cited

U.S. PATENT DOCUMENTS

| | | | |
|---|---|---|---|
| 6,862,748 B2 | 3/2005 | Prendergast | |
| 6,938,276 B1 | 9/2005 | Prendergast | |
| 6,957,449 B2 | 10/2005 | Prendergast | |
| 6,986,162 B2 | 1/2006 | Soto et al. | |
| 7,117,624 B2 | 10/2006 | Kim | |
| 7,219,370 B1 | 5/2007 | Teetzel et al. | |
| 7,302,808 B1 | 12/2007 | Teetzel et al. | |
| 7,418,738 B2 | 9/2008 | Prendergast | |
| 7,444,683 B2 | 11/2008 | Prendergast et al. | |
| 7,504,918 B2 | 3/2009 | Prendergast et al. | |
| 7,520,083 B2 | 4/2009 | Dextraze | |
| 7,647,927 B2 | 1/2010 | Teetzel et al. | |
| 7,649,701 B2 | 1/2010 | Prendergast et al. | |
| 7,685,759 B2 | 3/2010 | Teetzel | |
| 7,694,450 B2 | 4/2010 | Keng | |
| 7,712,241 B2 | 5/2010 | Teetzel et al. | |
| 7,715,125 B2 * | 5/2010 | Willey | A42B 3/042 359/815 |
| 7,735,159 B2 | 6/2010 | Prendergast | |
| 7,765,730 B2 | 8/2010 | Keng | |
| 7,797,875 B1 | 9/2010 | Carrier et al. | |
| 7,802,392 B2 | 9/2010 | Peterson et al. | |
| 7,814,698 B2 | 10/2010 | Fluhr et al. | |
| 7,819,547 B1 | 10/2010 | Teetzel et al. | |
| 7,841,120 B2 | 11/2010 | Teetzel et al. | |
| 7,866,083 B2 * | 1/2011 | Teetzel | F41G 11/003 342/45 |
| 7,996,917 B2 | 8/2011 | Prendergast | |
| 8,020,335 B2 | 9/2011 | Larsson et al. | |
| 8,047,118 B1 | 11/2011 | Teetzel et al. | |
| 8,091,265 B1 | 1/2012 | Teetzel et al. | |
| 8,100,044 B1 | 1/2012 | Teetzel et al. | |
| 8,112,933 B1 | 2/2012 | Swan | |
| 8,113,198 B2 | 2/2012 | Teetzel et al. | |
| 8,209,780 B1 | 7/2012 | Lemire | |
| 8,220,664 B1 | 7/2012 | Teetzel et al. | |
| 8,220,946 B1 | 7/2012 | Teetzel | |
| 8,230,636 B1 | 7/2012 | Swan | |
| 8,238,045 B2 | 8/2012 | Prendergast et al. | |
| 8,239,971 B2 | 8/2012 | Prendergast | |
| 8,297,173 B1 | 10/2012 | Teetzel et al. | |
| 8,305,685 B2 | 11/2012 | Heine et al. | |
| 8,336,246 B1 | 12/2012 | Barber | |
| 8,337,036 B2 | 12/2012 | Soto et al. | |
| 8,375,473 B2 | 2/2013 | Celona et al. | |
| 8,397,423 B2 | 3/2013 | Robinson | |
| 8,490,316 B2 | 7/2013 | Kincel et al. | |
| 8,531,592 B2 | 9/2013 | Teetzel et al. | |
| 8,561,518 B2 | 10/2013 | Teetzel et al. | |
| 8,661,571 B1 | 3/2014 | Teetzel et al. | |
| 8,739,313 B2 * | 6/2014 | Teetzel | A42B 3/04 2/422 |
| 8,800,194 B2 | 8/2014 | Teetzel et al. | |
| 8,826,463 B2 | 9/2014 | Teetzel et al. | |
| 8,857,097 B2 | 10/2014 | Rorick | |
| 9,203,063 B2 * | 12/2015 | Celona | H01M 2/1022 |
| 9,622,530 B2 * | 4/2017 | DiCarlo | A42B 3/042 |
| 2005/0241206 A1 | 11/2005 | Teetzel et al. | |
| 2007/0214551 A1 | 9/2007 | Teetzel et al. | |
| 2008/0134562 A1 | 6/2008 | Teetzel | |
| 2008/0168696 A1 | 7/2008 | Orne et al. | |
| 2008/0170838 A1 | 7/2008 | Teetzel et al. | |
| 2009/0135505 A1 | 5/2009 | Willey | 359/815 |
| 2010/0224193 A1 | 9/2010 | Teetzel et al. | |
| 2010/0299814 A1 | 12/2010 | Celona et al. | |
| 2011/0145981 A1 | 6/2011 | Teetzel et al. | |
| 2011/0239354 A1 | 10/2011 | Celona et al. | |
| 2012/0006719 A1 | 1/2012 | Celona et al. | |
| 2012/0043381 A1 | 2/2012 | Teetzel et al. | |
| 2012/0138059 A1 | 6/2012 | Teetzel et al. | |
| 2013/0083391 A1 * | 4/2013 | Teetzel | G02B 23/18 359/409 |
| 2013/0086722 A1 | 4/2013 | Teetzel et al. | |
| 2013/0094081 A1 * | 4/2013 | Chang | G02B 7/12 359/481 |
| 2013/0318852 A1 | 12/2013 | Teetzel et al. | |
| 2014/0237708 A1 | 8/2014 | DiCarlo | |
| 2014/0245523 A1 | 9/2014 | Teetzel et al. | |
| 2015/0253563 A1 | 9/2015 | DiCarlo | |

* cited by examiner

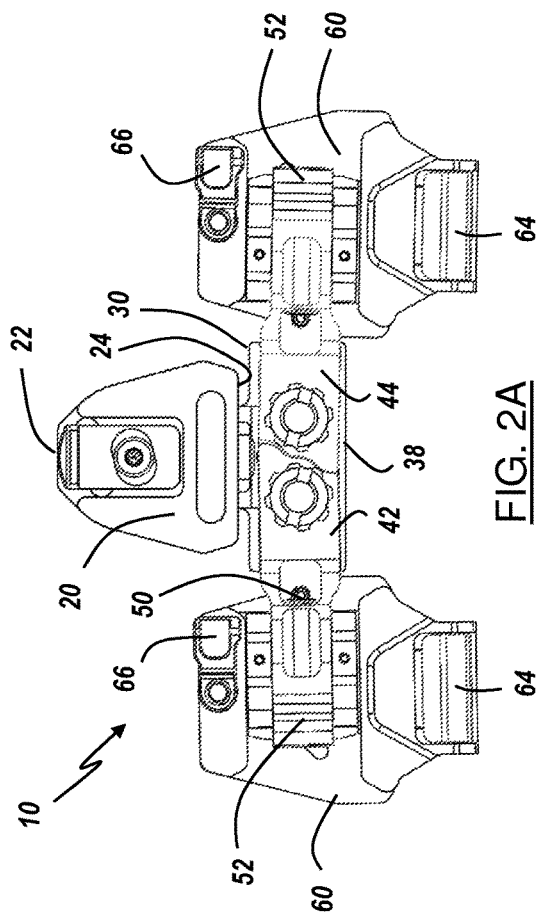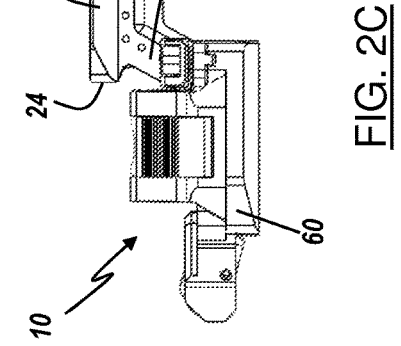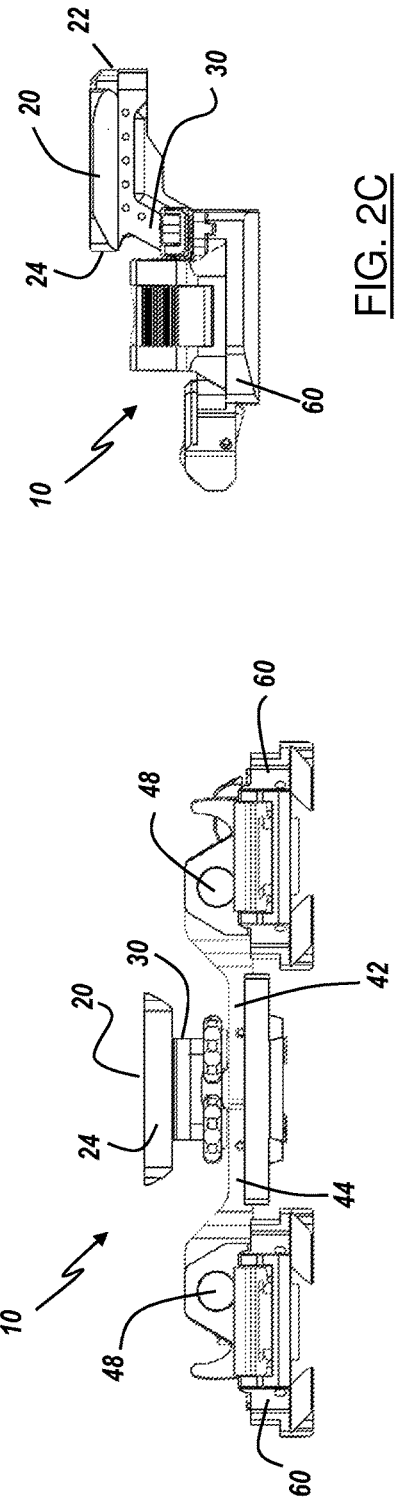

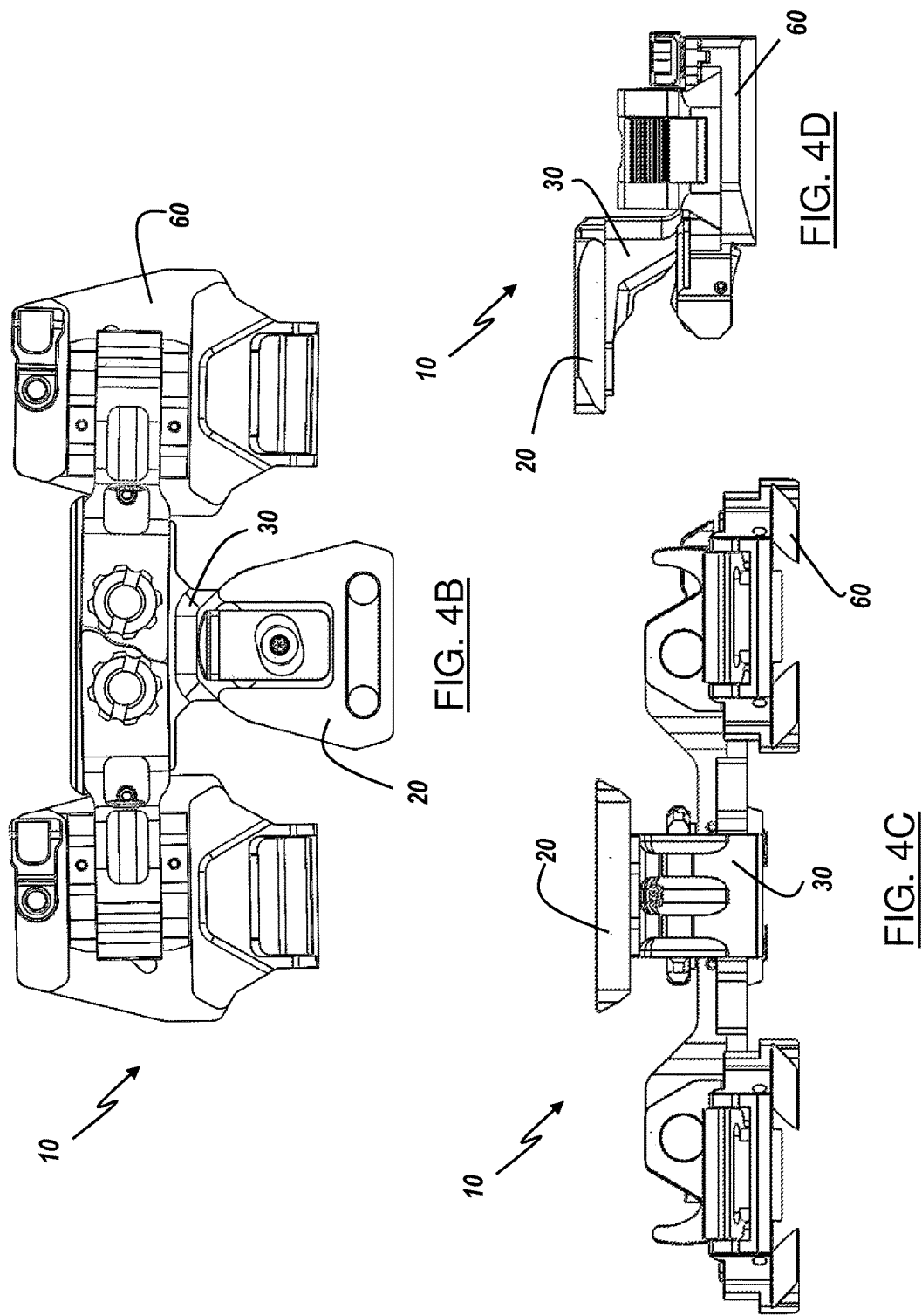

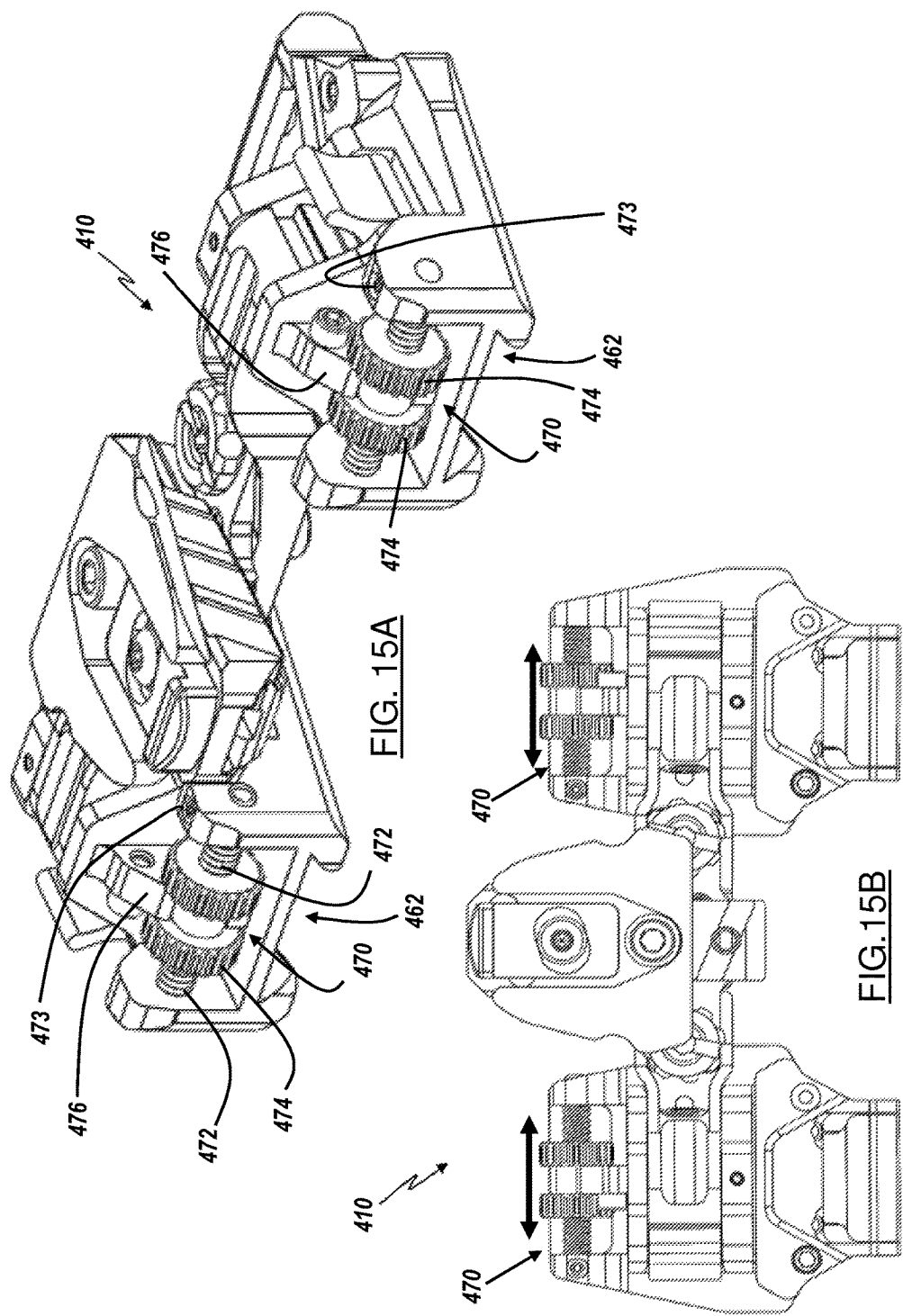

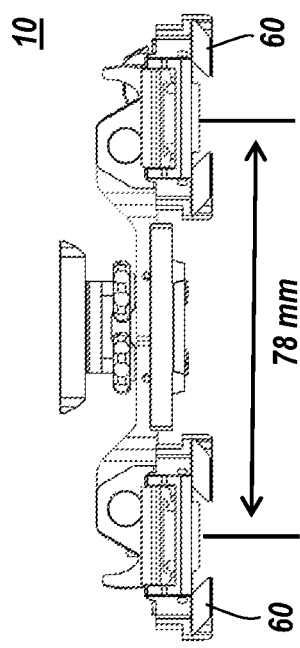
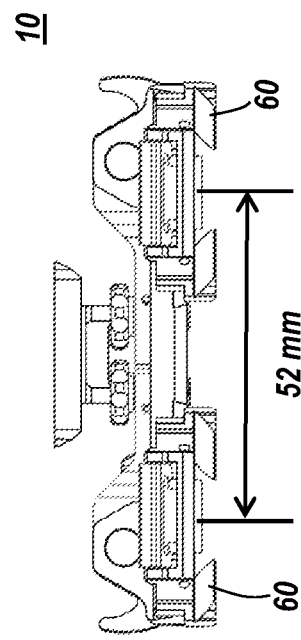

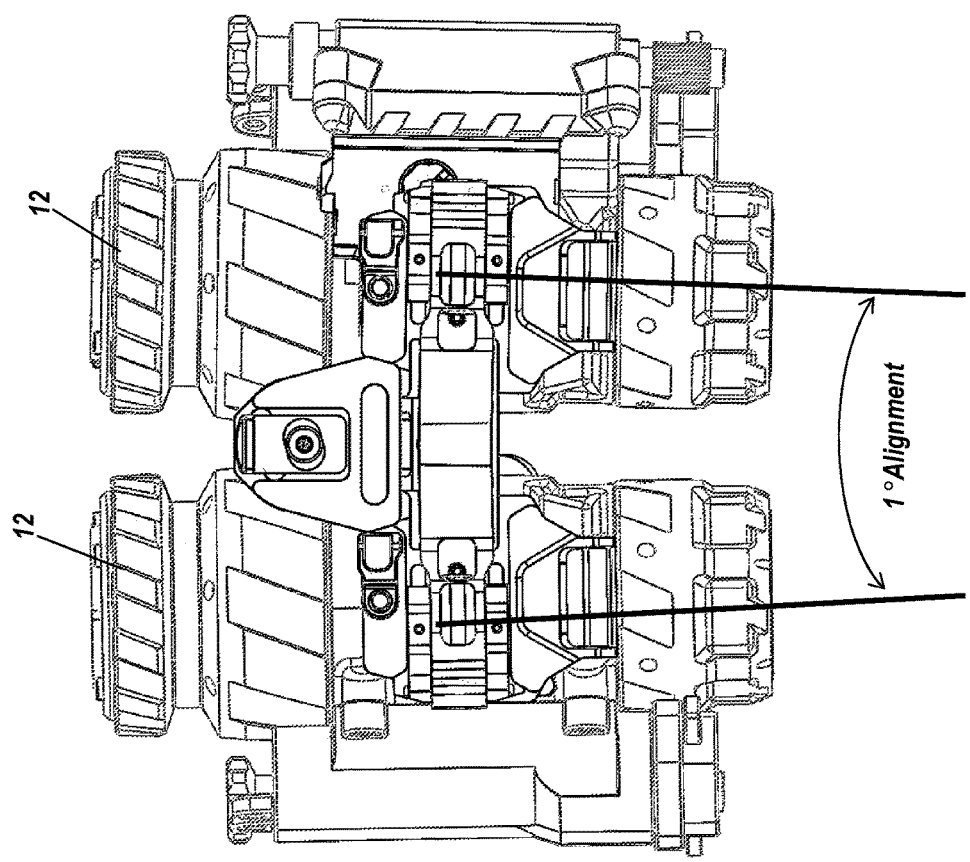

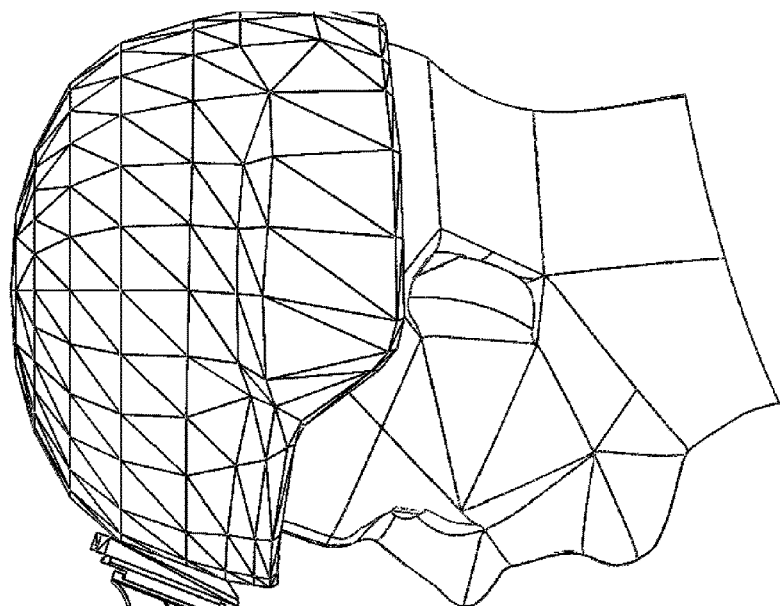
FIG. 22B
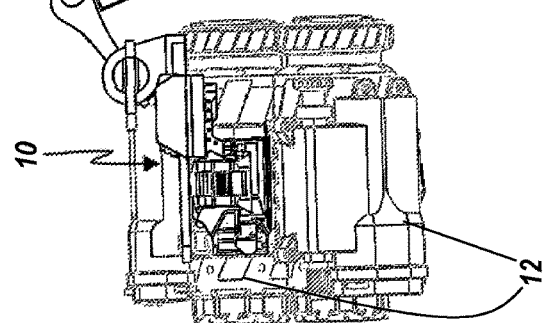
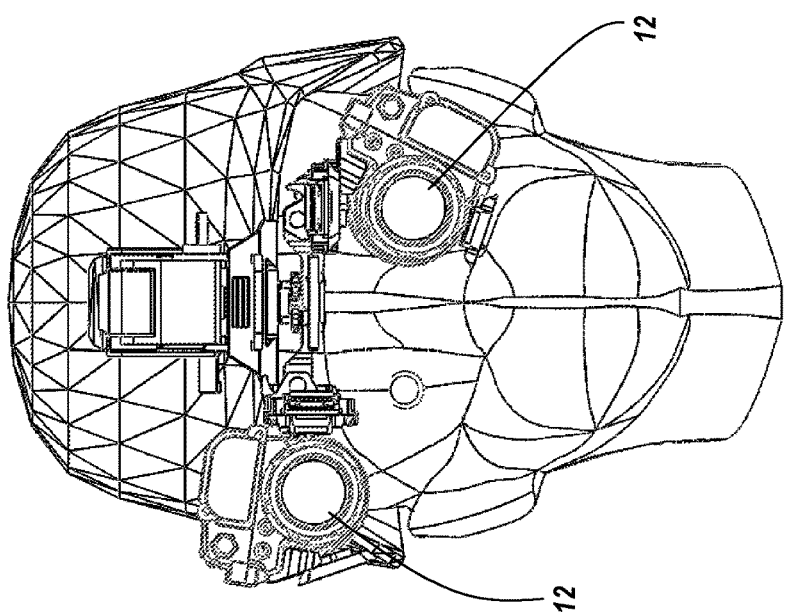
FIG. 22A

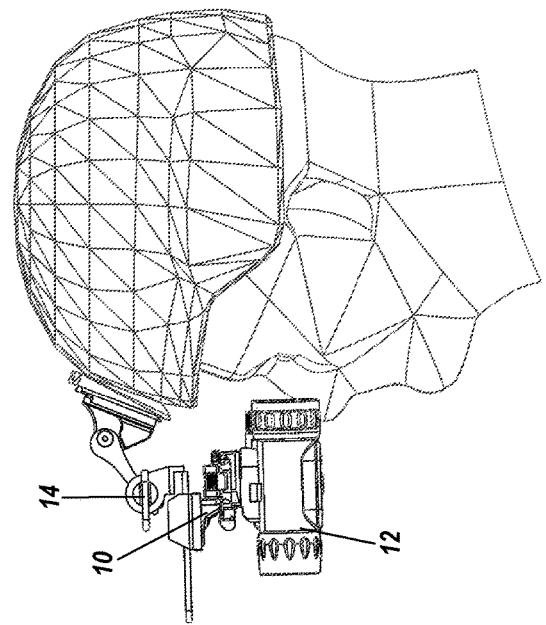
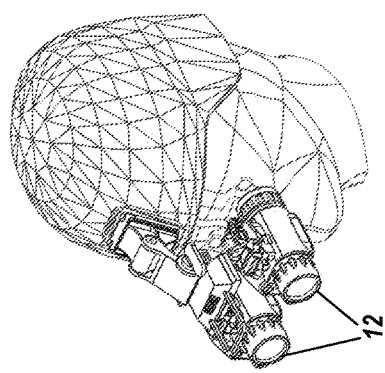
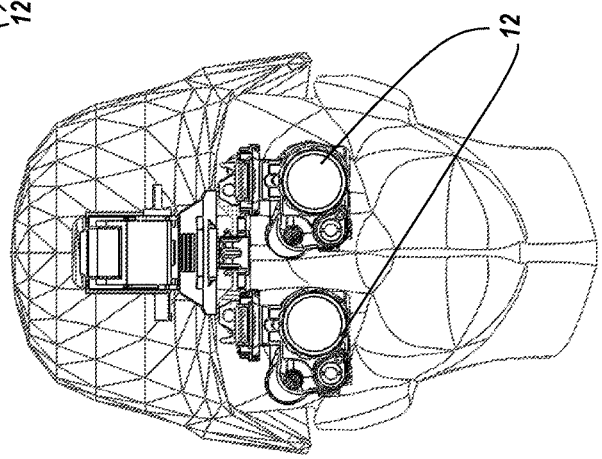

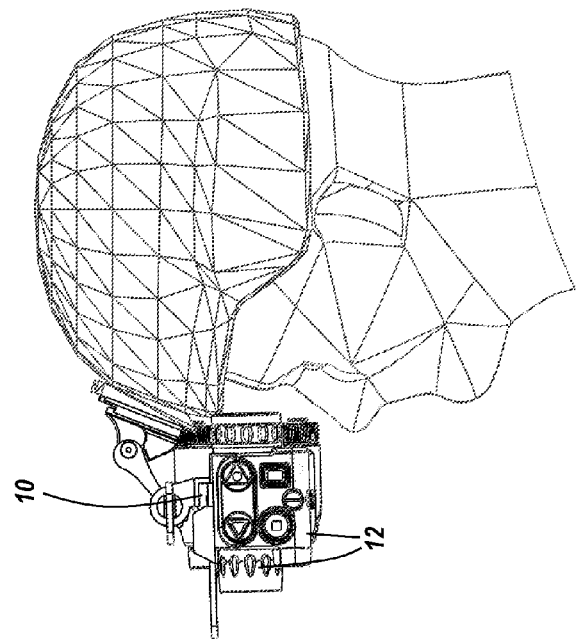
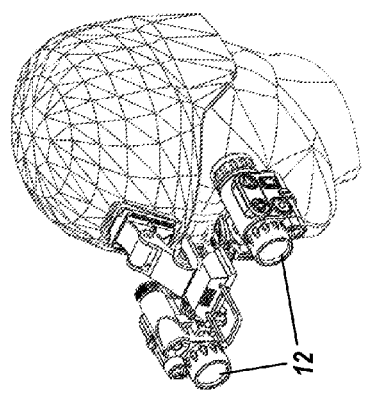
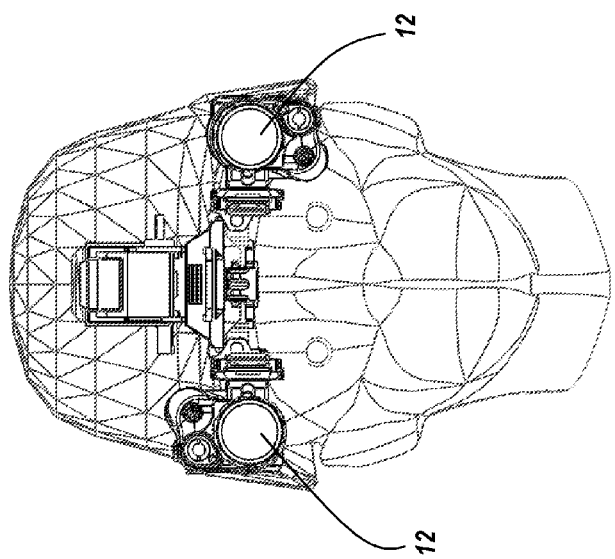
FIG. 29B
FIG. 29C
FIG. 29A

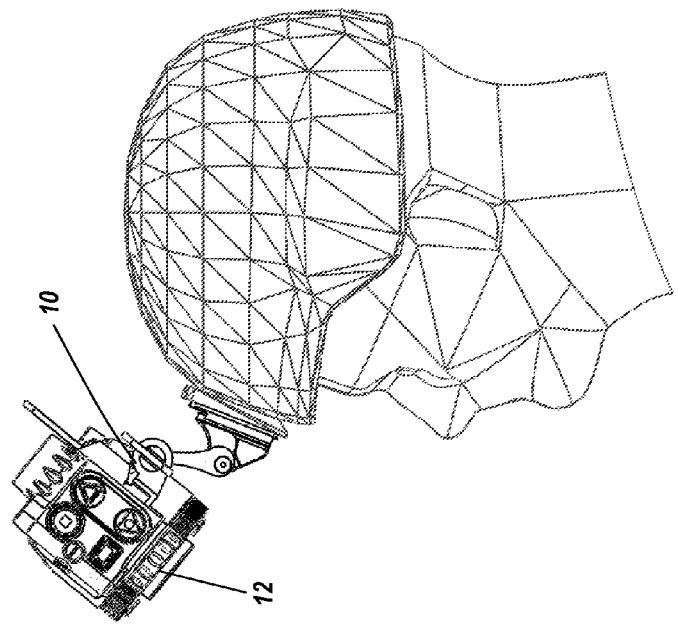
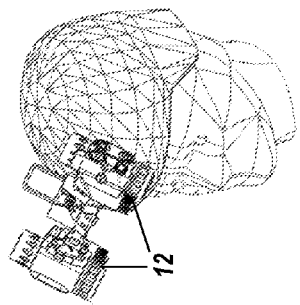
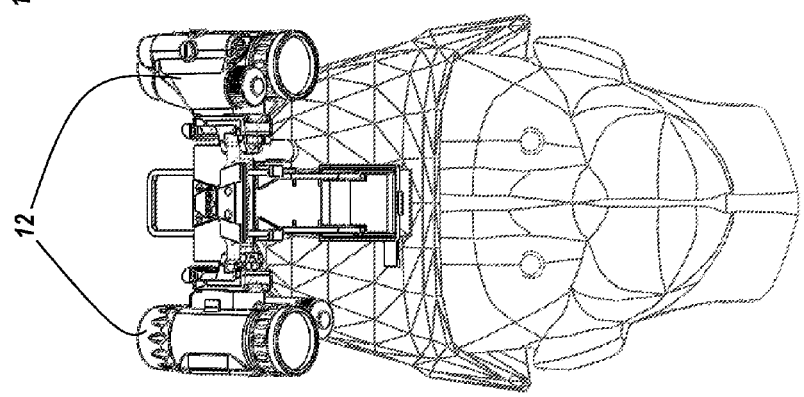
FIG. 30B
FIG. 30C
FIG. 30A

BRIDGE MOUNT DEVICE AND SYSTEM

CROSS REFERENCE TO RELATED APPLICATION

This application claims benefit of U.S. Provisional Application Ser. No. 62/072,710 entitled, "Bridge Mount Device and System," filed Oct. 30, 2014, and U.S. Provisional Application Ser. No. 62/153,245 entitled, "Bridge Mount Device and System," filed Apr. 27, 2015, the entire disclosures of which are incorporated herein by reference.

FIELD OF THE DISCLOSURE

The present disclosure is generally related to mounting devices and more particularly is related to an optical bridge mount device.

BACKGROUND OF THE DISCLOSURE

Optical devices are commonly used in various environments to enhance the capabilities of the user's vision. In military environments, various optical devices are used to give a soldier enhanced visibility in harsh conditions. For example, devices like the PVS 14 night vision monocular or small thermal cameras are commonly used in the military to enhance a soldier's visibility in low light conditions. These optical devices are affixed to combat helmets, weapons, or other structures that a soldier uses, and during a field operation, a soldier may move the optical device between the various mounting structures.

During operational use of the optical device, it may be necessary for the user to move the optical device between various positions, namely from a position for viewing with the left eye to a position for viewing with the right eye. Conventional mounting devices allow some repositioning of the optical device, but to do so, the user must take apart portions of the mounting hardware and then reassemble the mounting hardware in the different configuration. When repositioning of the optical device is urgently required, the time it takes to remove the mounting hardware and reposition may exceed the time available. When conventional mounting hardware is taken apart, the various pieces, including fasteners and clip, may be easily dropped, misplaced, or lost. Furthermore, particulate matter may be prone to contaminating the closely-toleranced connections within the mounting hardware when the connections are exposed, thereby increasing the possibility of failures within the mounting hardware.

Thus, a heretofore unaddressed need exists in the industry to address the aforementioned deficiencies and inadequacies.

SUMMARY OF THE DISCLOSURE

Embodiments of the present disclosure provide a bridge mount device. Briefly described, in architecture, one embodiment of the adapter, among others, can be implemented as follows. A bridge mount device includes a mounting shoe. A connector is affixed to the mounting shoe. A bridge assembly has at least two bridge arms, wherein each of the at least two bridge arms has an optical device mount, wherein the at least two bridge arms are detachably connected to the connector, and wherein the mounting shoe is vertically and horizontally offset from the bridge assembly.

The present disclosure can also be viewed as providing a bridge mount device. Briefly described, in architecture, one embodiment of the apparatus, among others, can be implemented as follows. The bridge mount device has a mounting shoe. A connector is affixed to the mounting shoe. A bridge assembly has at least two bridge arms, each at least two bridge arms has an optical device mount, wherein the at least two bridge arms are detachably connected to the connector, and wherein the mounting shoe is horizontally adjustable from the bridge assembly.

The present disclosure can also be viewed as providing a bridge mount device. Briefly described, in architecture, one embodiment of the apparatus, among others, can be implemented as follows. The bridge mount device has a mounting shoe. A connector is affixed to the mounting shoe. A bridge assembly has at least two bridge arms, wherein each bridge arm has an optical device mount with an optical device connected thereto. A fastener connects each bridge arm to the connector, wherein an alignment of optical paths of the optical devices is adjustable.

The present disclosure can also be viewed as providing a method of mounting an optical device to a mounting structure. In this regard, one embodiment of such a method, among others, can be broadly summarized by the following steps: providing a bridge assembly having two bridge arms; mounting an optical device to each of the two bridge arms; removably connecting the bridge arms to a shelf of a connector on at least one of: a top side of the shelf and an underside of the shelf; and mounting the connector to the mounting structure with a mounting shoe.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 2A-2C are top, front side, and right side views, respectively, of the bridge mount device of FIG. 1, in accordance with the first exemplary embodiment of the present disclosure.

FIGS. 4A-4D are corresponding isometric, top, front side, and left side views, respectively, of a bridge mount device, in accordance with the first exemplary embodiment of the present disclosure.

FIGS. 15A-15B are isometric and top views of a bridge mount device with an adjustment mechanism, in accordance with any of the exemplary embodiments of the present disclosure.

FIGS. 15C-15D are front side views of an adjustment of a bridge mount device, in accordance with any of the exemplary embodiments of the present disclosure.

FIGS. 19A-19B are isometric and top views, respectively, of an alignment of a bridge mount device, in accordance with any of the exemplary embodiments of the present disclosure.

FIGS. 20A-23B are corresponding front and side views, respectively, of positioning of an optical device with a bridge mount device, in accordance with any exemplary embodiment of the present disclosure.

FIGS. 24A-31C are corresponding front, side, and isometric views, respectively, of positioning of an optical device with a bridge mount device, in accordance with the first exemplary embodiment of the present disclosure.

DETAILED DESCRIPTION

Figure 1:
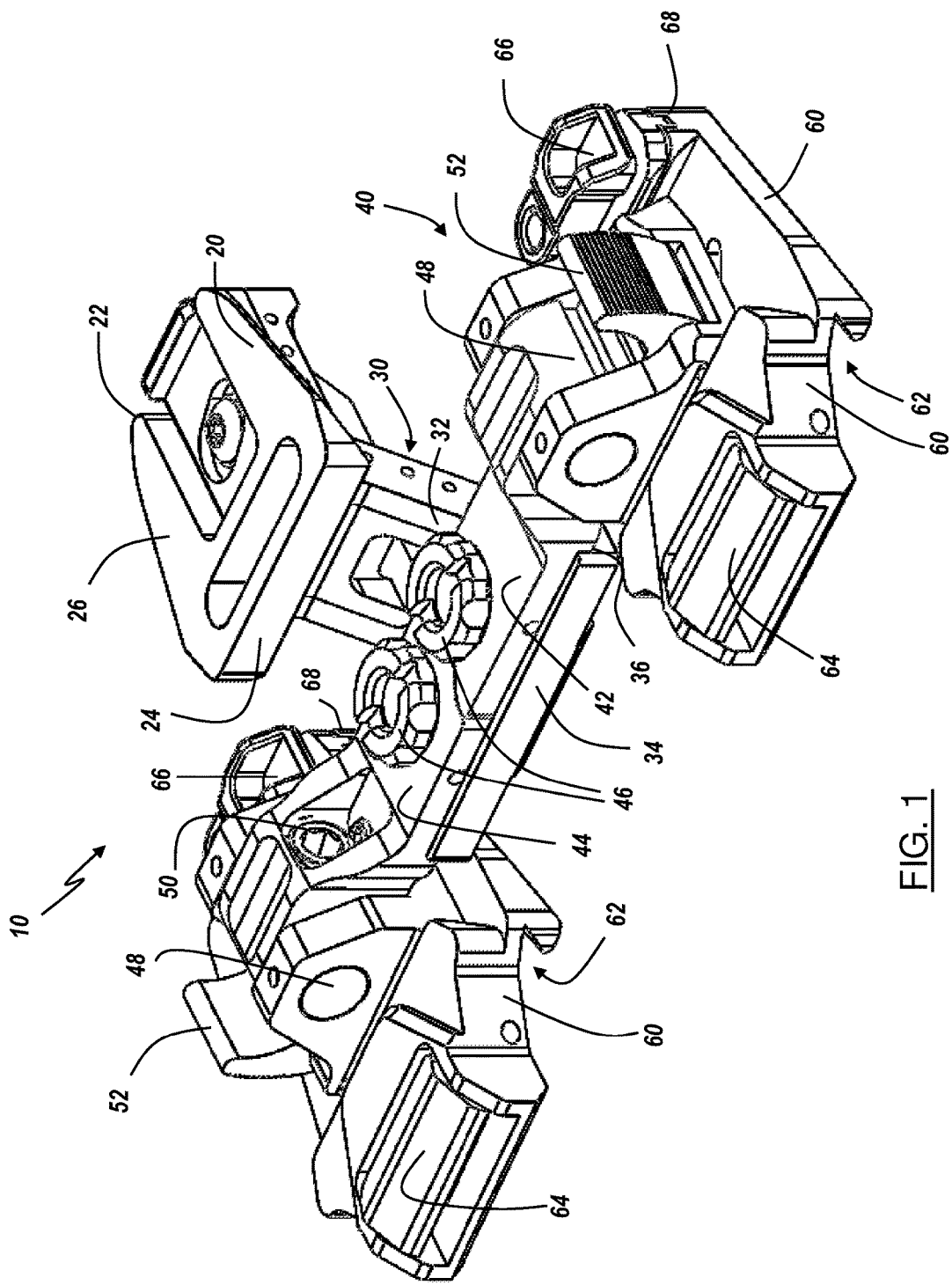
FIG. 1 is an isometric view illustration of a bridge mount device, in accordance with a first exemplary embodiment of the present disclosure.

FIG. 1 is an isometric view illustration of a bridge mount device 10, in accordance with a first exemplary embodiment of the present disclosure. FIGS. 2A-2C are top, front side, and right side views, respectively, of the bridge mount device of FIG. 1, in accordance with the first exemplary embodiment of the present disclosure. Relative to FIGS. 1-2C, the bridge mount device 10, which may be referred to herein as 'device 10' includes a mounting shoe 20. A connector 30 is affixed to the mounting shoe 20. A bridge assembly 40 has at least two bridge arms 42, 44, wherein the at least two bridge arms 42, 44 are detachably connected to the connector 30, wherein the at least two bridge arms 42, 44 have an optical device mount 60. The mounting shoe 20 may be vertically and horizontally offset from the bridge assembly 40, such that the mounting shoe 20 is positionable outside of a footprint of the bridge assembly 40.

The device 10 may be used to mount an optical device, such as a night vision monocular to a combat helmet or other headgear, commonly found within military environments. The device 10 may offer significant benefits over conventional mounting devices by allowing the user to orient the optical device in a variety of positions without having to disconnect the optical device from the helmet mount. Other benefits of the device 10 are disclosed in detail herein.

The mounting shoe 20 of the device 10 may include a shoe that is known within the industry and conventionally used for mounting optical devices to combat helmets or other devices, such as weapons. The mounting shoe 20 may be sized to connect to a shoe receiver which is mounted to the helmet. The connection may be established by the angled sides of the mounting shoe 20 engaging with corresponding angled sides of the shoe receiver, and an actuatable latch which connects to the mounting shoe 20 to retain the mounting shoe 20 within the shoe receiver. The mounting shoe 20 may include a front edge 22 and a rear edge 24 which generally oppose one another. The front edge 22 of the mounting shoe 20 may have a smaller width or be narrower than a rear edge 24 of the mounting shoe 20, which allows the mounting shoe 20 to obtain a proper engagement with a mounting shoe receiver.

The connector 30 may be removably or integrally connected to the mounting shoe 20 and extend away from the mounting shoe 20, commonly in both a horizontal and vertical direction. Within this disclosure, the horizontal direction may be characterized as a direction which is substantially aligned with forwards or backwards movement of the mounting shoe 20 as it would be received or removed from a mounting shoe receiver. Relative to the mounting shoe 20, the horizontal direction may be aligned with a vector extending from the rear edge 24 to the front edge 22. The vertical direction may be characterized as a direction aligned with a perpendicular vector to the top surface 26 of the mounting shoe 20. As is shown in FIG. 1, the connector 30 may include an angled leg 32 and a shelf 34 connected thereto, where the angled leg 32 is positioned between the mounting shoe 20 and the shelf 34. The angled leg 32 may extend between the shelf 34 and the mounting shoe 20 at a non-perpendicular angle, such that the angled leg 32 is oriented along a diagonal path between the mounting shoe 20 and the shelf 34.

The shelf 34 may be sized to receive the two bridge arms 42, 44. The shelf 34 may have an engagement surface 36 which generally includes a contact surface with the two bridge arms 42, 44. For example, in FIG. 1, the engagement surface 36 may be the surface of the shelf 34 which abuts the underside of the two bridge arms 42, 44. At least one guide structure 38 may be positioned offset from the shelf engagement surface 36, such that the guide structure 38 can orient the at least two bridge arms 42, 44 to the shelf 34 properly.

In FIG. 1, the guide structure 38 includes a wall that extends vertically upwards from the engagement surface 36 and abuts a sidewall of the two bridge arms 42, 44. The use of guide structure 38 with the shelf 34 may allow the two bridge arms 42, 44 to be properly aligned relative to the connector 30 and the mounting shoe 20. As is further shown in FIGS. 1-2C, the at least two bridge arms 42, 44 may be detachably connected to a top side of the shelf 34. In other designs, the at least two bridge arms 42, 44 may be detachably connected to an underside of the shelf 34.

The bridge assembly 40 having the two bridge arms 42, 44 may be used to connect the optical devices (not shown) to the helmet. Each of the two bridge arms 42, 44 may have an optical device mount 60 at one end and may engage with the shelf 34 of the connector 30 with an arm removal screw 46 or similar fastener. For example, as is shown in FIG. 1, the two bridge arms 42, 44 may be connected to a top side of the connector 30, thereby allowing sufficient contact between the two bridge arms 42, 44 and the shelf 34 to position and retain the two bridge arms 42, 44 during movement of the assembly. Each of the two bridge arms 42, 44 may extend outwards from the connector 30 and mounting shoe 20.

A pivot connection 48 may be provided approximately at a distal end of each of the two bridge arms 42, 44, which allows the optical device to pivot or move between varying positions, discussed relative to later figures of this disclosure. The pivot connection 48 may include a pivot friction force adjustment screw 50 which allows for proper friction on the pivot connection 48, thereby allowing the operator of the device 10 to control the necessary force with which the pivot connection 48 moves. For example, after significant usage time of the device 10, the pivot connection 48 may become prone to inadvertent movements (such as when a user wearing the helmet to which the device 10 is attached jumps) which, due to the weight of the optical device, may cause the pivot connection 48 to move. The adjustment screw 50 may be actuated to apply additional force to the pivot connection 48, thereby preventing inadvertent movements of the pivot connection 48.

The device 10 further includes locking latches 52 positioned on the two bridge arms 42, 44. The locking latches 52 may be actuated by a user's thumb (or similar actuation), which allows the user to control the movement of the optical device about the pivot connection 48, namely, to lock the pivot connection 48 in a nonrotatable state. In other words, the locking latch 52 may be used to lock the optical device to a specific position using the pivot connection 48, such that once locked, the optical device is unable to inadvertently rotate to another position. While the adjustment screw 50 provides some prevention of inadvertent movement of the pivot connection 48, the locking latch 52 ensures that pivoting/rotating movement of the optical device only occurs when the operator of the device 10 actuates the locking latch 52.

The optical device mount 60 may be connected to the distal (extended) end of the bridge arms 42, 44, and generally be positioned under the pivot connection 48, as is shown in FIGS. 1-2C. The optical device mount 60 includes a mounting shoe receiver 62 which is engagable with a mounting shoe on an optical device. It also includes a forward latch 64 which allows the mounting shoe of the optical device to be locked into the mounting shoe receiver 62.

At a side of the optical device mount 60, engaged between the bridge arms 42, 44 and the optical device mount 60, an optic left/right locking tab 66 may be included to control lateral movement of the optical device mount 60 relative to the arms 42, 44, the connector 30, and the mounting shoe 20. The optic left/right locking tab 66 allows the optical device mount 60 of each bridge arm 42, 44 to be movable in a lateral direction relative to the bridge arm 42, 44. In other words, the optic left/right locking tab 66 permits a user to adjust the distance between a first optical device mount 60 on a first bridge arm 42 and a second optical device mount 60 on a second bridge arm 44. This adjustment in the lateral direction (perpendicular to both the vertical and horizontal directions) permits the optical devices to be adjusted to match the distance between a user's eyes. The optic left/right locking tab 66 may control a slot and guide structure 68 which controls the movement of the optical device mount 60 to move relative to the guide arms 42, 44. The slot and guide structure 68 may utilize a first component with a slot therein which receives an elongated protrusion within the slot. Upon release of the optic left/right locking tab 66, the elongated protrusion is allowed to move within the slot. When the desired positioning of the optical device mount 60 is achieved, the optic left/right locking tab 66 may be actuated to lock the elongated protrusion to the slot, the locking of which may be achieved by a friction state or level within the slot and guide structure 68.

Figure 3A:
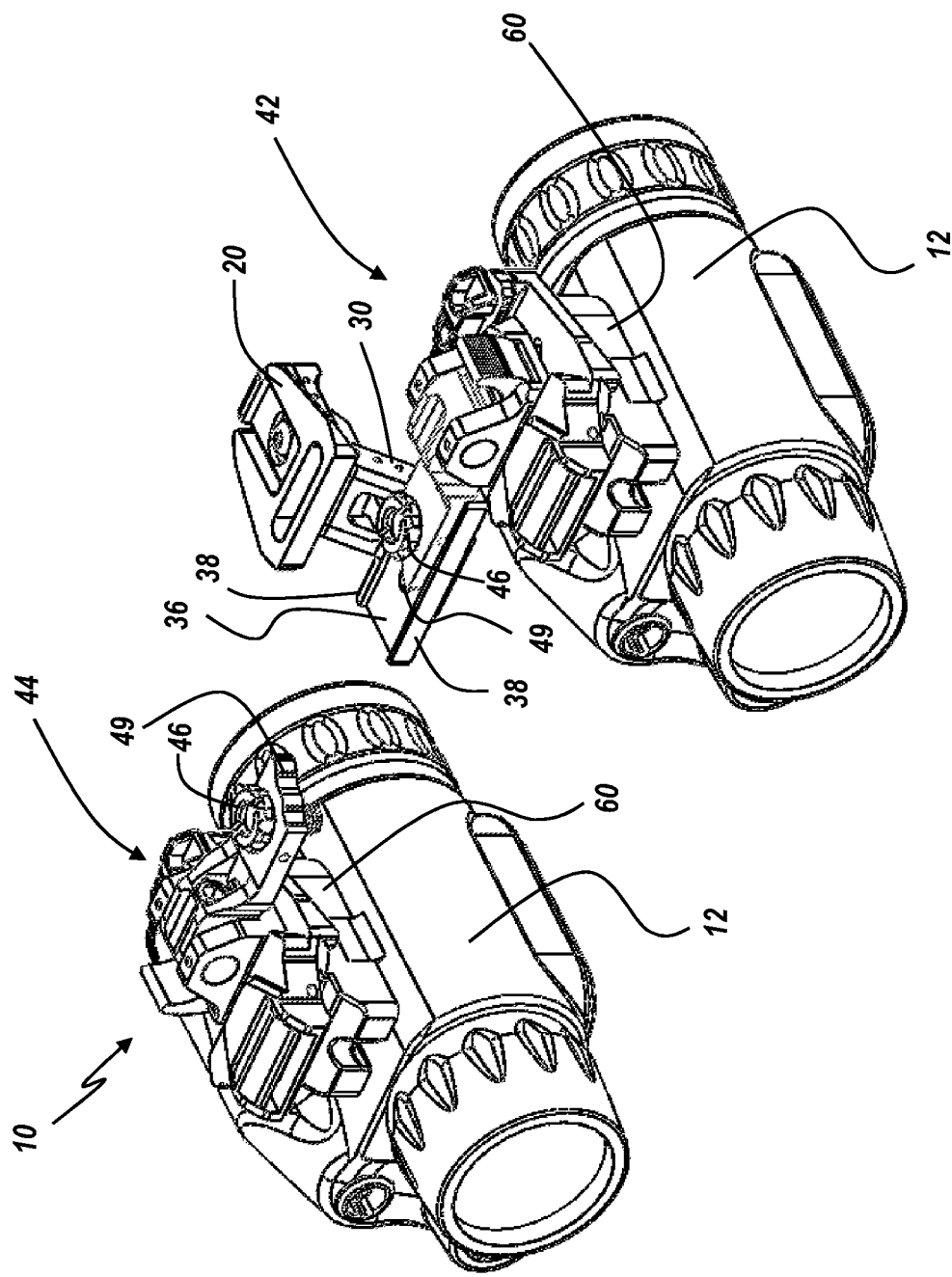
FIGS. 3A-3B are partially exploded isometric views of a bridge mount device, in accordance with the first exemplary embodiment of the present disclosure.
Figure 3B:
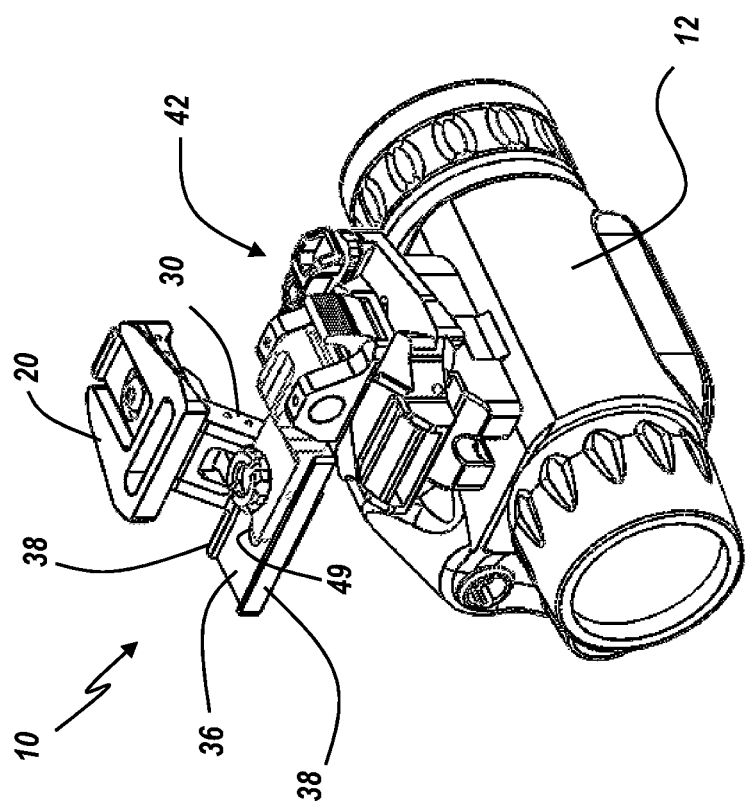
Figure 4A:
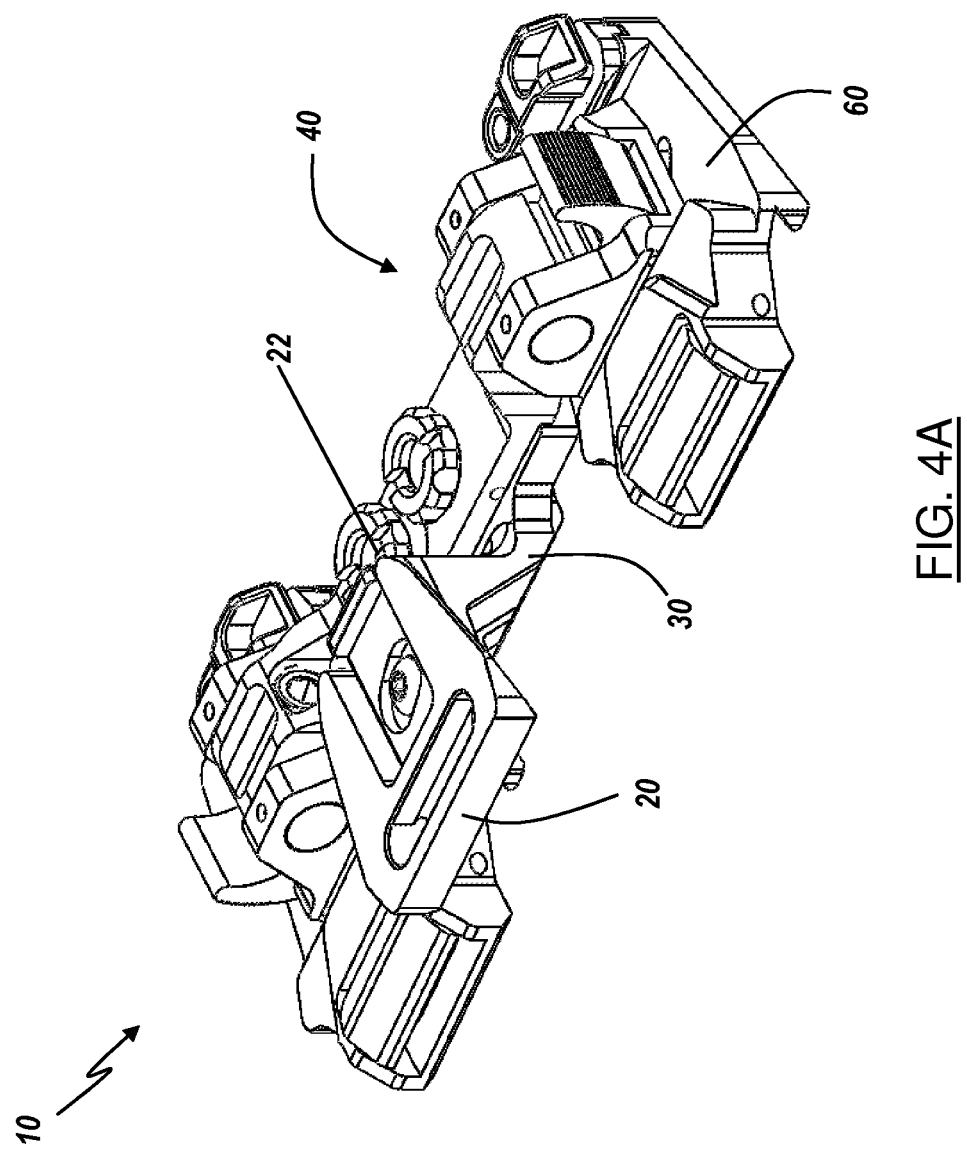

FIGS. 3A-3B are partially exploded isometric views of a bridge mount device 10, in accordance with the first exemplary embodiment of the present disclosure. As is shown, an optical device 12 may be mounted to the optical device mount 60 of the device 10. The connection between the optical device 12 and the optical device mount 60 may be secured with the mounting shoe and mounting shoe receiver connection. The bridge arms 42, 44 may be removed from the shelf 34 using screws 46, wherein the bridge arms 42, 44 may slide out along the shelf 34. As is shown clearly, the shelf 34 includes a mounting surface 36 which is not positioned on the side or sides of the mounting shoe 20 (or combined mounting shoe 20 and connector 30 assembly).

Further, it can be seen that the shelf 34 has the engagement surface 36 which has the guide structure 38 positioned on either edge of the shelf 34. The bridge arms 42, 44 may be sized to fit snugly between the guide structures 38. It can also been seen that the ends of each of the bridge arms 42, 44 may be designed to engage or contact one another with a non-flat engagement. For example, each of the ends 49 of the bridge arms 42, 44 may have a jagged or puzzle-like edge which interconnects with the corresponding end 49 of the opposing bridge arm 42, 44.

FIGS. 4A-4D are corresponding isometric, top, front side, and left side views, respectively, of a bridge mount device 10, in accordance with the first exemplary embodiment of the present disclosure. The device 10 is similar to the device 10 discussed in FIGS. 1-2C, but the connector 30 is positioned to face an opposite direction than it is facing in the device 10 of FIGS. 1-2C which may achieve a mounting structure which is positioned closer to a user's helmet, and therefore, closer to the user's eyes. In FIGS. 1-2C, the mounting shoe 20 is horizontally offset from the bridge assembly 40 with a rear edge 24 of the mounting shoe 20 facing the bridge assembly 40. In FIGS. 4A-4D, however, the mounting shoe 20 is horizontally offset from the bridge assembly 40 with a front edge 22 of the mounting shoe 20 facing the bridge assembly 40. In addition to the differently-facing mounting shoe 20, the connector 30 may be extending from the bridge assembly 40 in a different direction as well. For example, the connector 30 may be extending from the bridge assembly 40 in a direction towards the entrance of the optical device mounts 60 in FIGS. 4A-4D, as opposed to FIGS. 1-2C which show the connector 30 extending from the opposing direction (opposite the entrance of the optical device mounts 60). This configuration and positioning of the connector 30 may allow the device 10 to be positioned closer to the helmet than the device 10 of FIGS. 1-2C. All other components and features are as described previously.

Figure 5A:
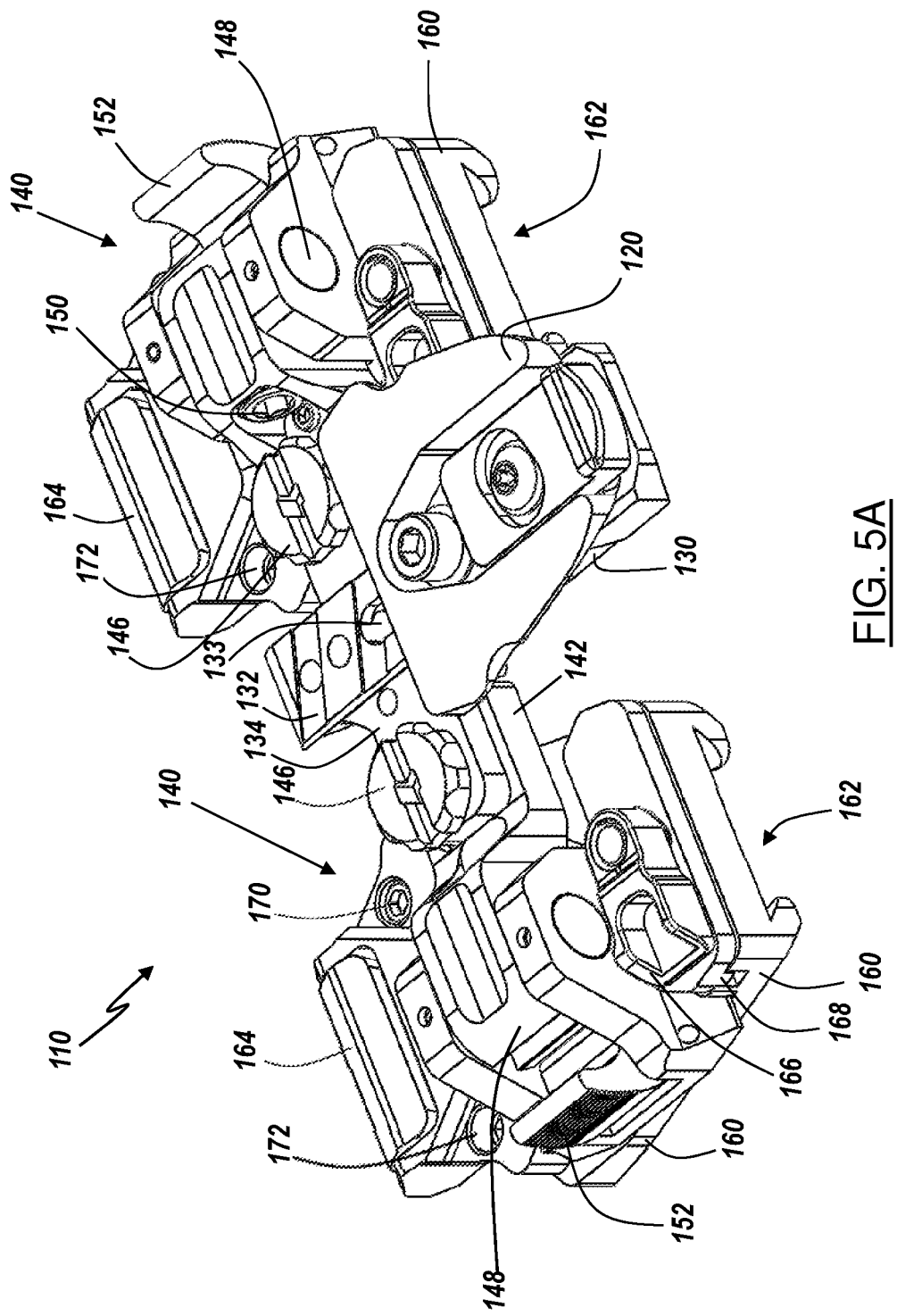
FIGS. 5A-5C are isometric, top, and side view illustrations, respectively, of a bridge mount device, in accordance with a second exemplary embodiment of the present disclosure.
Figure 5C:
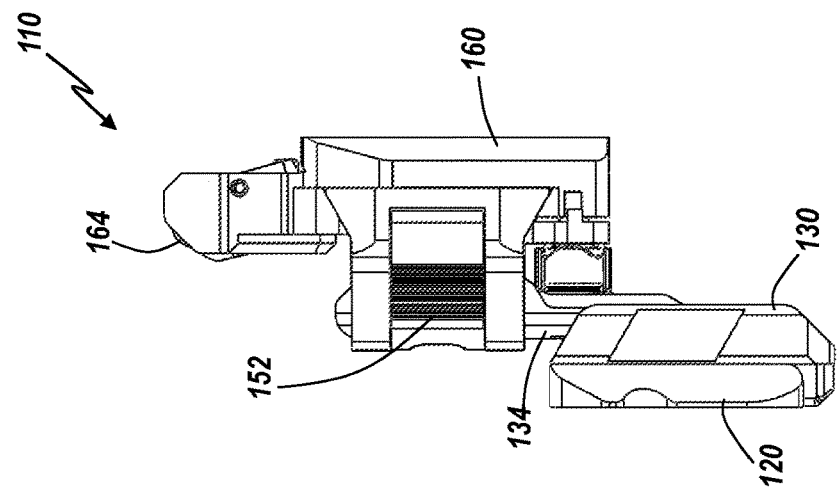
Figure 5B:
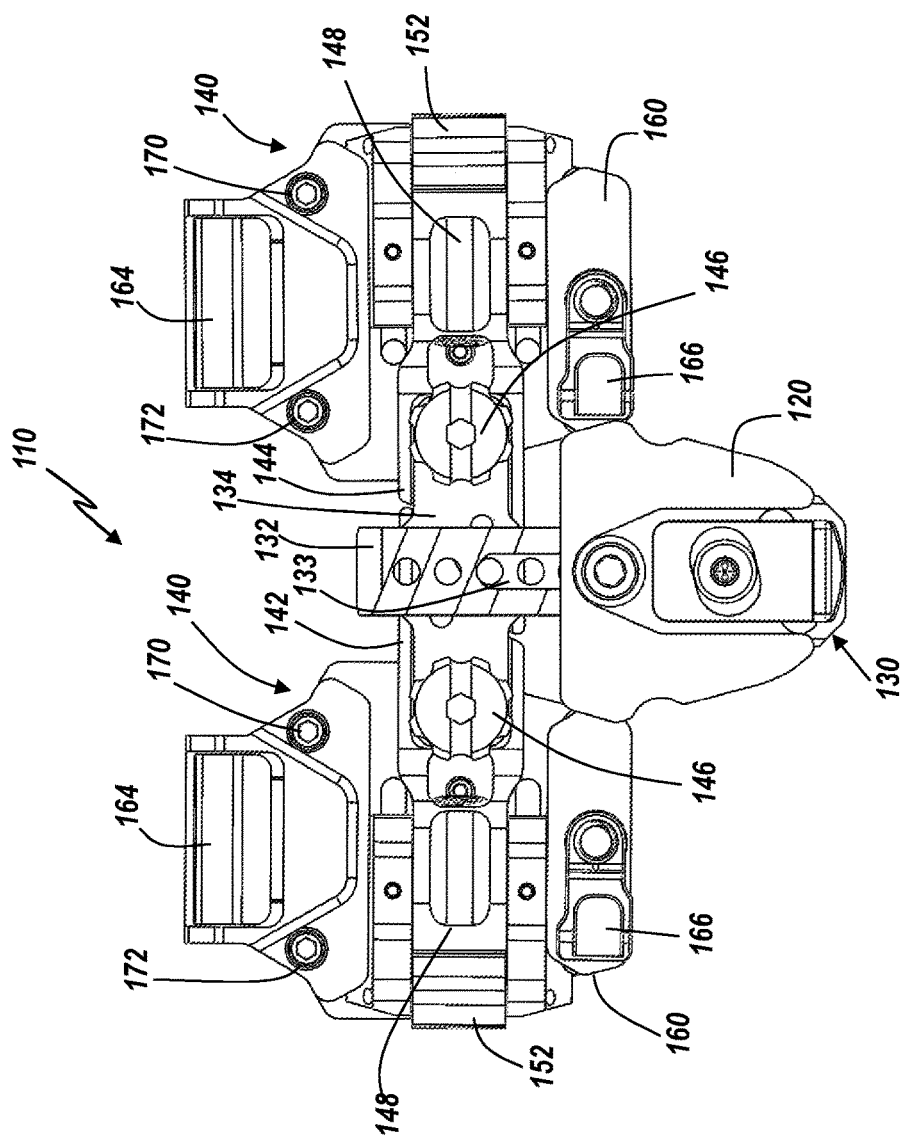

FIGS. 5A-5C is are isometric, top, and side view illustrations, respectively, of a bridge mount device 110, in accordance with a second exemplary embodiment of the present disclosure. Relative to FIGS. 5A-5C, the bridge mount device 110, which may be referred to herein as 'device 110' may be substantially similar to the bridge mount device 10 of the first exemplary embodiment and may include any of the features described relative to any of the embodiments of this disclosure. The bridge mount device 110 includes a mounting shoe 120. A connector 130 is affixed to the mounting shoe 120. A bridge assembly 140 has at least two bridge arms 142, 144, wherein the at least two bridge arms 142, 144 are detachably connected to the connector 130, wherein the at least two bridge arms 142, 144 have an optical device mount 160. The mounting shoe 120 may be horizontally adjustable from the bridge assembly 140.

The mounting shoe 120 of the device 110 may include a shoe that is known within the industry and conventionally used for mounting optical devices to combat helmets or other devices, such as weapons. The mounting shoe 120 may be sized to connect to a shoe receiver which is mounted to the helmet. The connection may be established by the angled sides of the mounting shoe 120 engaging with corresponding angled sides of the shoe receiver, and an actuatable latch which connects to the mounting shoe 120 to retain the mounting shoe 20 within the shoe receiver.

Figure 6A:
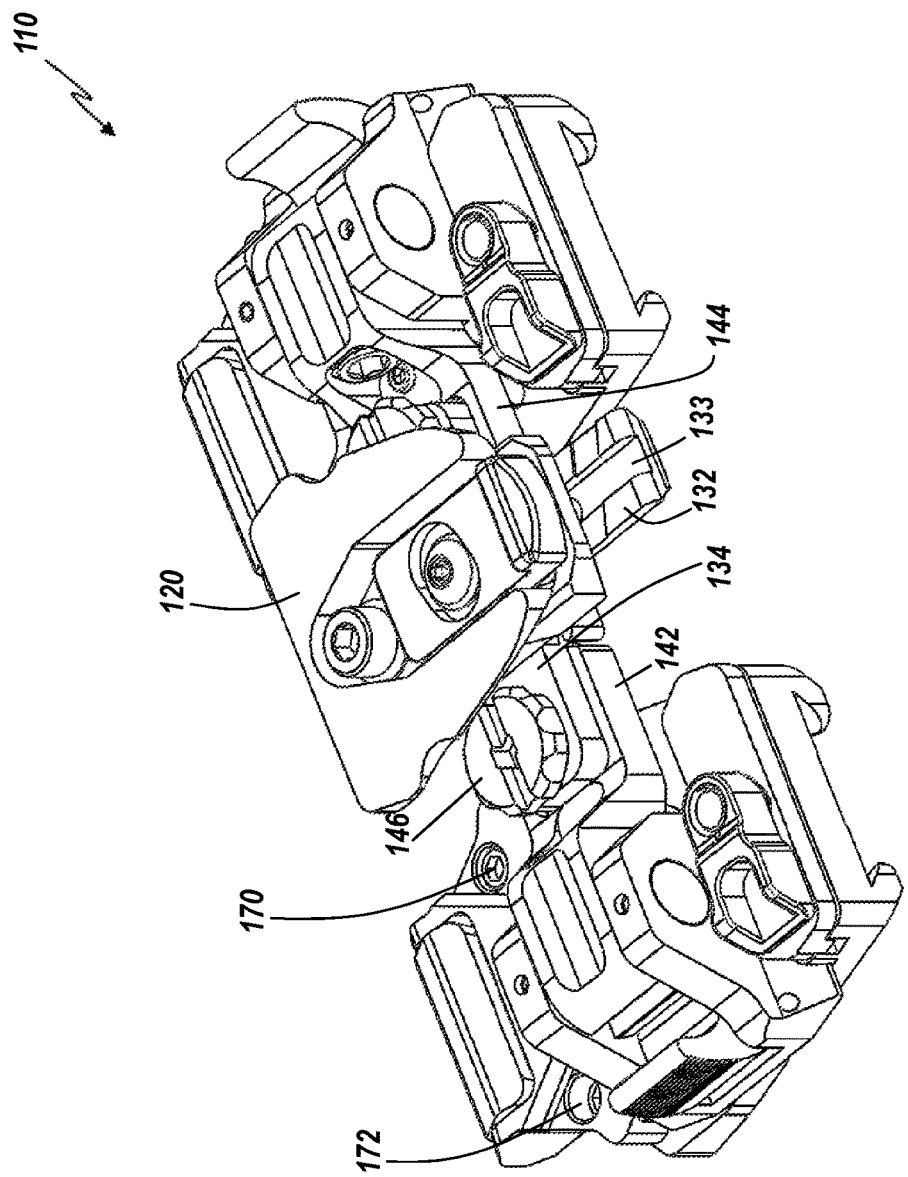
FIGS. 6A-6C are isometric, top, and side views, respectively, of the bridge mount device of FIGS. 5A-5C, in accordance with the second exemplary embodiment of the present disclosure.
Figure 6C:
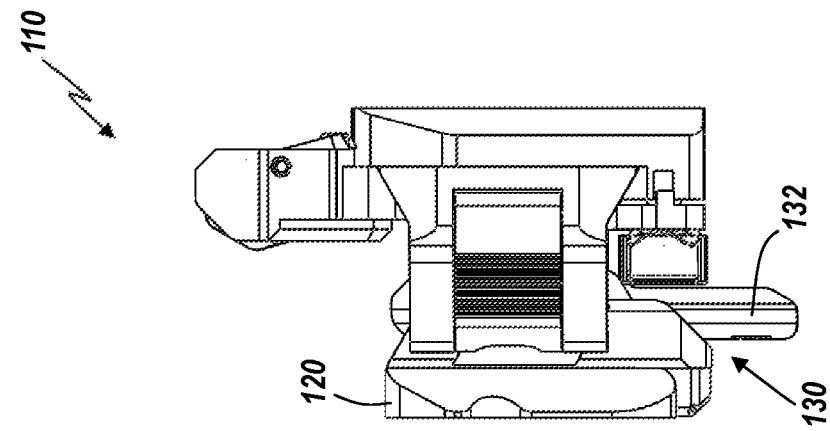
Figure 6B:
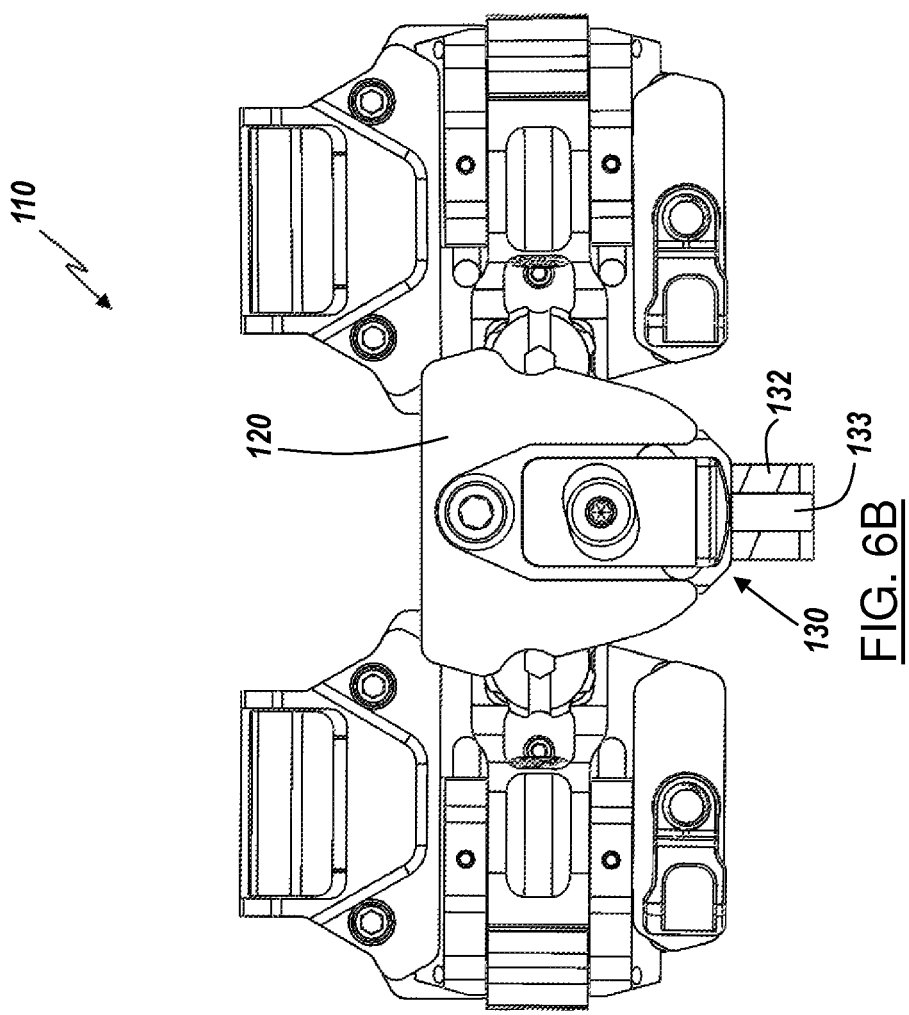

The connector 130 may be removably or integrally connected to the mounting shoe 120 and extend away from the mounting shoe 120. For example, as is shown in FIG. 5A, the connector 130 may include a rail 132 with an elongated slot 133 formed therein, where the distal end of the rail 132 is connected to a shelf 134. The rail 132 may be positioned between the mounting shoe 120 and the shelf 134 and the mounting shoe 120 may be adjustable along a length of the rail 132. The rail 132 may extend laterally from the shelf 134 and support the mounting shoe 120 on a proximal end thereof. The mounting shoe 120 may be movable along a portion of the length of the rail 132, thereby allowing the mounting shoe 120 to be positioned a spaced distance from the shelf 134, as shown in FIGS. 5A-5C, or a closer distance to the shelf 134, as shown in FIGS. 6A-6C. The elongated slot 133 may be positioned substantially parallel to the length of the rail 132, wherein the mounting shoe 120 is movably mounted to the elongated slot 133.

The rail 132 may be capable of being rotated relative to the shelf 134, such as being swiveled 180° relative to the shelf 134 to allow the mounting shoe 120 to be moved closer or farther from the eyes of the user without contacting a helmet of the user to which the device 110 is mounted. Prior to the rail 132 being swiveled 180°, the mounting shoe 120 may be removed from the rail 132. After the rail 132 is positioned in the 180° swiveled position, the mounting shoe 120 may be reattached thereto and in a substantially opposite direction (180°) from its position pre-swivel. This rotation of the mounting shoe 120 180° after the 180° rotation of the rail 132 allows for the correct positioning of the mounting shoe 120 relative to a mounting structure it will connect to, e.g., to allow the optical devices to face the correct direction. The shelf 134 may be sized to receive the two bridge arms 142, 144. The shelf 134 may include guides allowing the two bridge arms 142, 144 to be properly aligned relative to the connector 130 and the mounting shoe 120.

The bridge assembly 140 having the two bridge arms 142, 144 may be used to connect the optical devices (not shown) to the helmet. Each of the two bridge arms 142, 144 may engage with the shelf 134 of the connector 130 with an arm removal screw 146 or similar fastener. For example, as is shown in FIG. 5A, the two bridge arms 142, 144 may be connected to a bottom side of the connector 130, thereby allowing sufficient contact between the two bridge arms 142, 144 and the shelf 134 to position and retain the two bridge arms 142, 144 during movement of the assembly. Each of the two bridge arms 142, 144 may extend outwards from the connector 130 and mounting shoe 120. The arm removal screws 146 may also allow for adjustment of a convergence angle of the optical devices, e.g., an optical alignment of a viewing direction of the optical devices, by controlling a pivot of the optical devices about the arm removal screws 146. For example, each of the bridge arms 142, 144 may be rotatable about its respective arm removal screws 146.

Additional connections, such as pivot connection 148 may be provided approximately at a distal end of each of the two bridge arms 142, 144, which allows the optical device to pivot or move between varying positions, discussed relative to later figures of this disclosure. The pivot connection 148 may include a pivot friction force adjustment screw 150 which allows for proper friction on the pivot connection 148, thereby allowing the operator of the device 110 to control the necessary force with which the pivot connection 148 moves. For example, after significant usage time of the device 110, the pivot connection 148 may become prone to inadvertent movements (such as when a user wearing the helmet to which the device 110 is attached jumps) which, due to the weight of the optical device, may cause the pivot connection 148 to move. The adjustment screw 150 may be actuated to apply additional force to the pivot connection 148, thereby preventing inadvertent movements of the pivot connection 148.

The device 110 further includes locking latches 152 positioned on the two bridge arms 142, 144. The locking latches 152 may be actuated by a user's thumb (or similar actuation), which allows the user to control the movement of the optical device about the pivot connection 148. In other words, the locking latch 152 may be used to lock the optical device to a specific position using the pivot connection 148, such that once locked, the optical device is unable to inadvertently move (rotate) to another position. While the adjustment screw 150 provides some prevention of inadvertent movement of the pivot connection 148, the locking latch 152 ensures that pivoting/rotating movement of the optical device only occurs when the operator of the device 110 actuates the locking latch 152.

The optical device mount 160 may be connected to the distal (extended) end of the bridge arms 142, 144, and generally be positioned under the pivot connection 148, as is shown in FIGS. 5A-5C. The optical device mount 160 includes a mounting shoe receiver 162 which is engagable with a mounting shoe on an optical device. It also includes a forward latch 164 which allows the mounting shoe of the optical device to be locked into the mounting shoe receiver 162. On the sides of the forward latch 164 two screws 170, 172 may be positioned through the bridge assembly 140, which are used to ensure that an optical device does not inadvertently become removed from the female pocket shoe on the bridge assembly 140. Thus, the screws 170, 172 are a failsafe for ensuring that the optical device does not become removed from the bridge assembly 140 if the forward latch fails. Further discussion of this feature is provided relative to FIGS. 8-12.

At a side of the optical device mount 160, engaged between the bridge arms 142, 144 and the optical device mount 160, an optic left/right locking tab 166 may be included to control lateral movement of the optical device mount 160 relative to the arms 142, 144, the connector 130, and the mounting shoe 120. The optic left/right locking tab 166 may control a slot and guide structure 168 which allows the optical device mount 160 to move relative to the guide arms 142, 144. The optic left/right locking tab 166 may be rotated to control a friction level within the slot and guide structure 168.

FIGS. 6A-6C are isometric, top, and side views, respectively, of the bridge mount device 110 of FIGS. 5A-5C, in accordance with the second exemplary embodiment of the present disclosure. The bridge mount device 110 includes the same components as discussed relative to FIGS. 5A-5C but the bridge mount device 110 is illustrated with the mounting shoe 120 in a configuration where the rail 132 of the connector 130 has been rotated 180° to allow the mounting shoe 120 to be positioned closer to the shelf 134 than it is positioned in FIGS. 5A-5C. In this position, as shown, the mounting shoe 120 may be positioned substantially overhead the arms 142, 144, e.g., not horizontally offset from the bridge assembly 140, and partially over the fasteners 146 which retain the arms 142, 144 to the shelf 134.

Figure 7A:
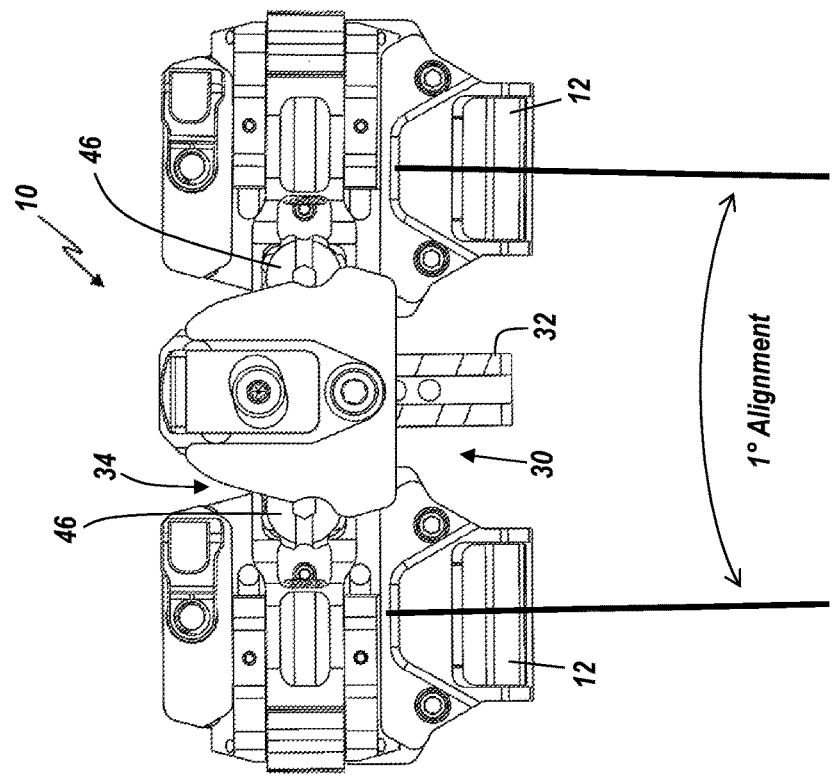
FIGS. 7A-7B are top views of an alignment of the bridge mount device of FIGS. 5A-5C, in accordance with the second exemplary embodiment of the present disclosure.
Figure 7B:
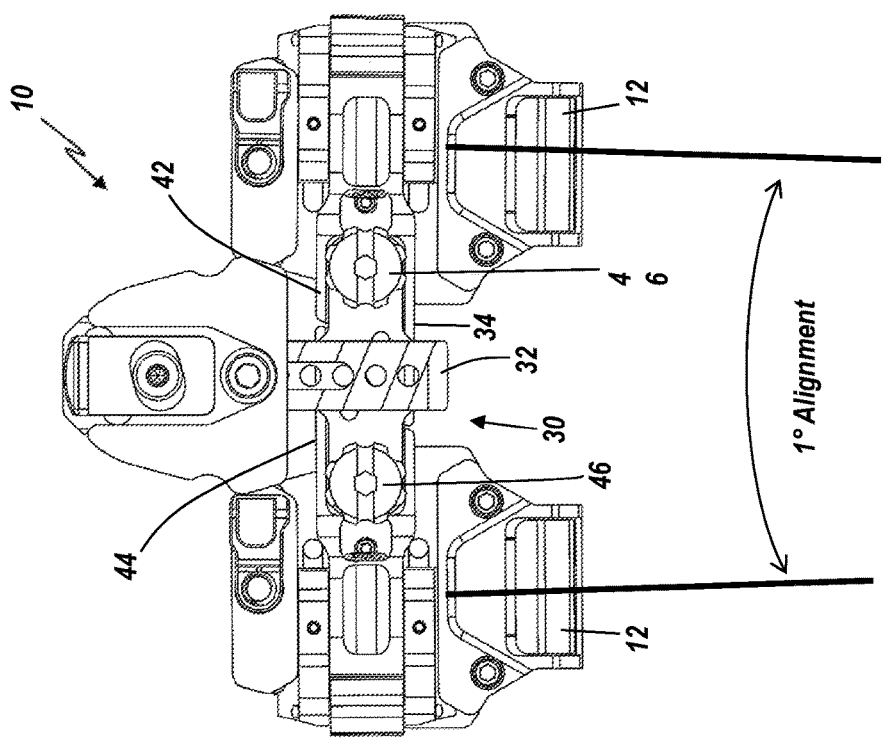
Figure 8:
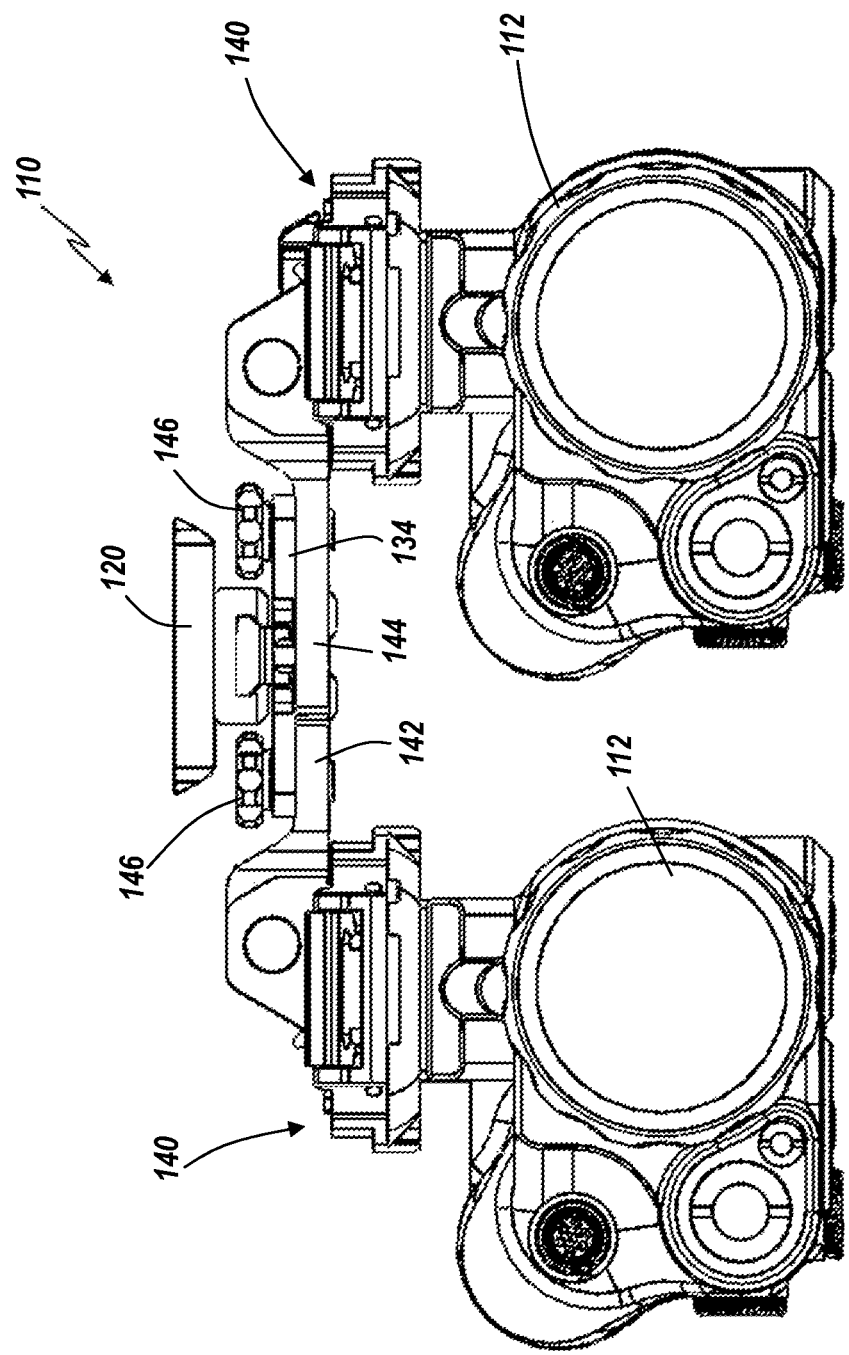
FIG. 8 is a front view illustration of the bridge mount device of FIGS. 5A-5C with optical devices, in accordance with the second exemplary embodiment of the present disclosure.
Figure 9:
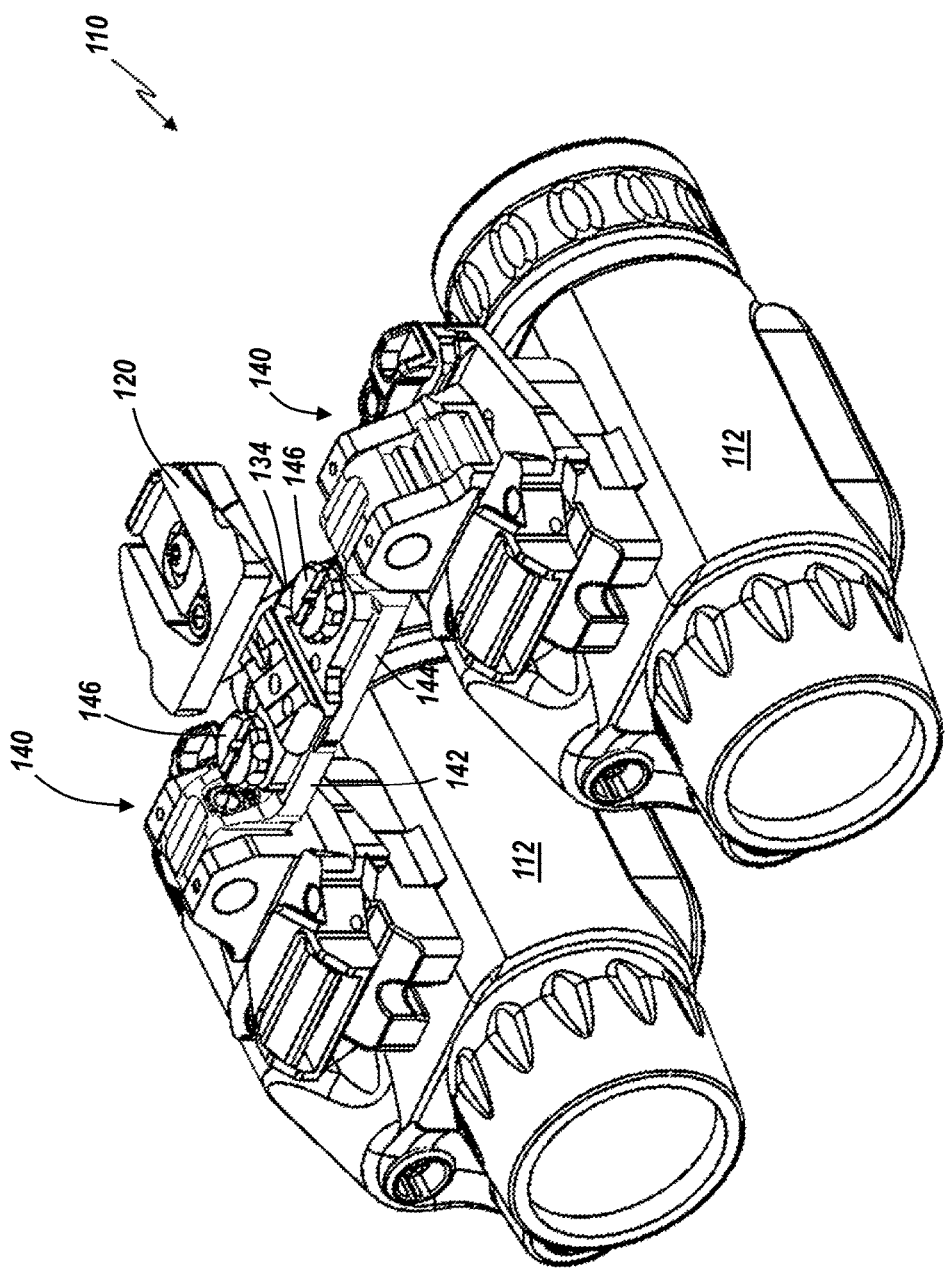
FIG. 9 is an isometric view illustration of the bridge mount device of FIGS. 5A-5C with optical devices, in accordance with the second exemplary embodiment of the present disclosure.
Figure 10:
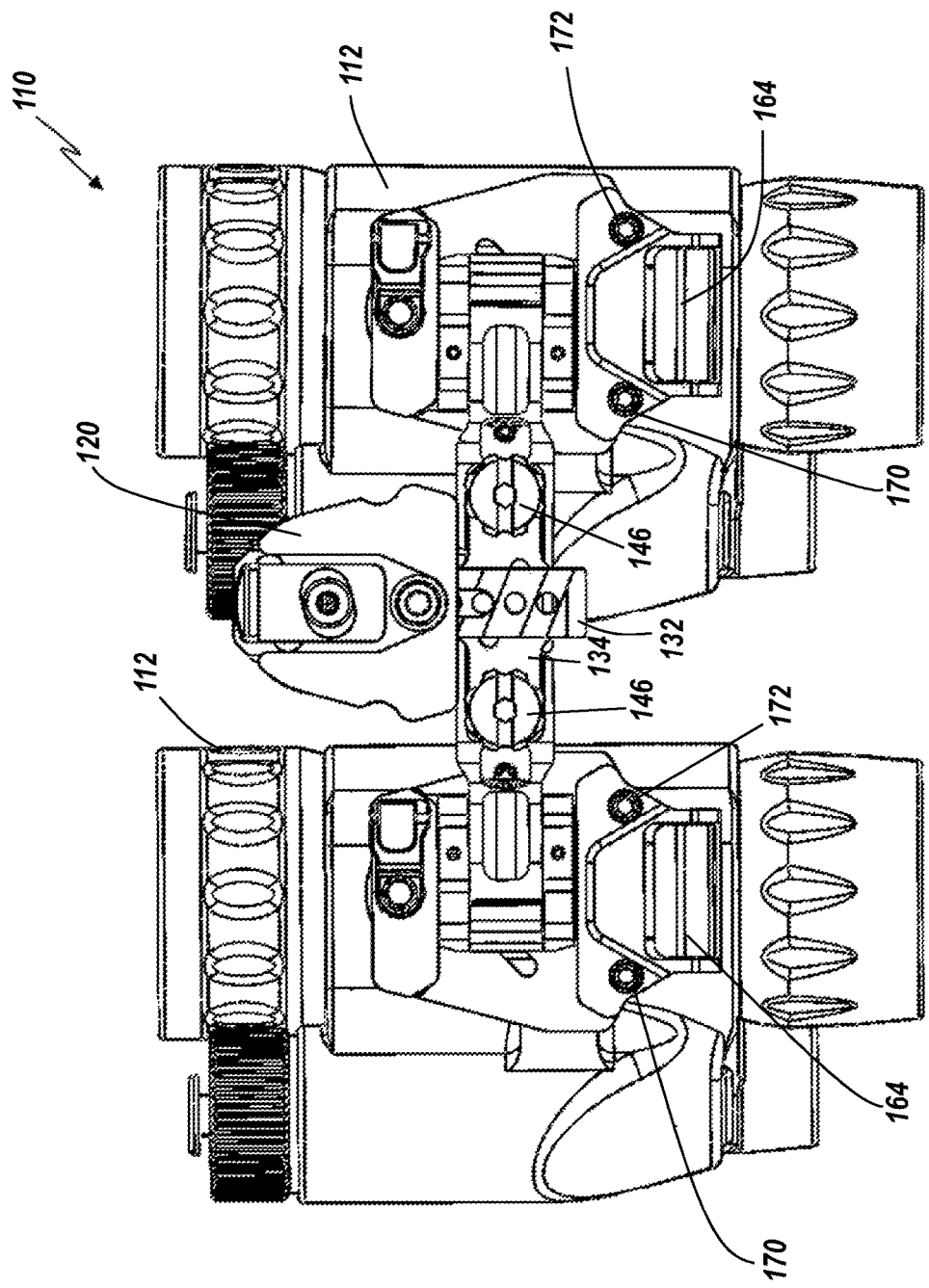
FIG. 10 is a top view illustration of the bridge mount device of FIGS. 5A-5C with optical devices, in accordance with the second exemplary embodiment of the present disclosure.
Figure 11:
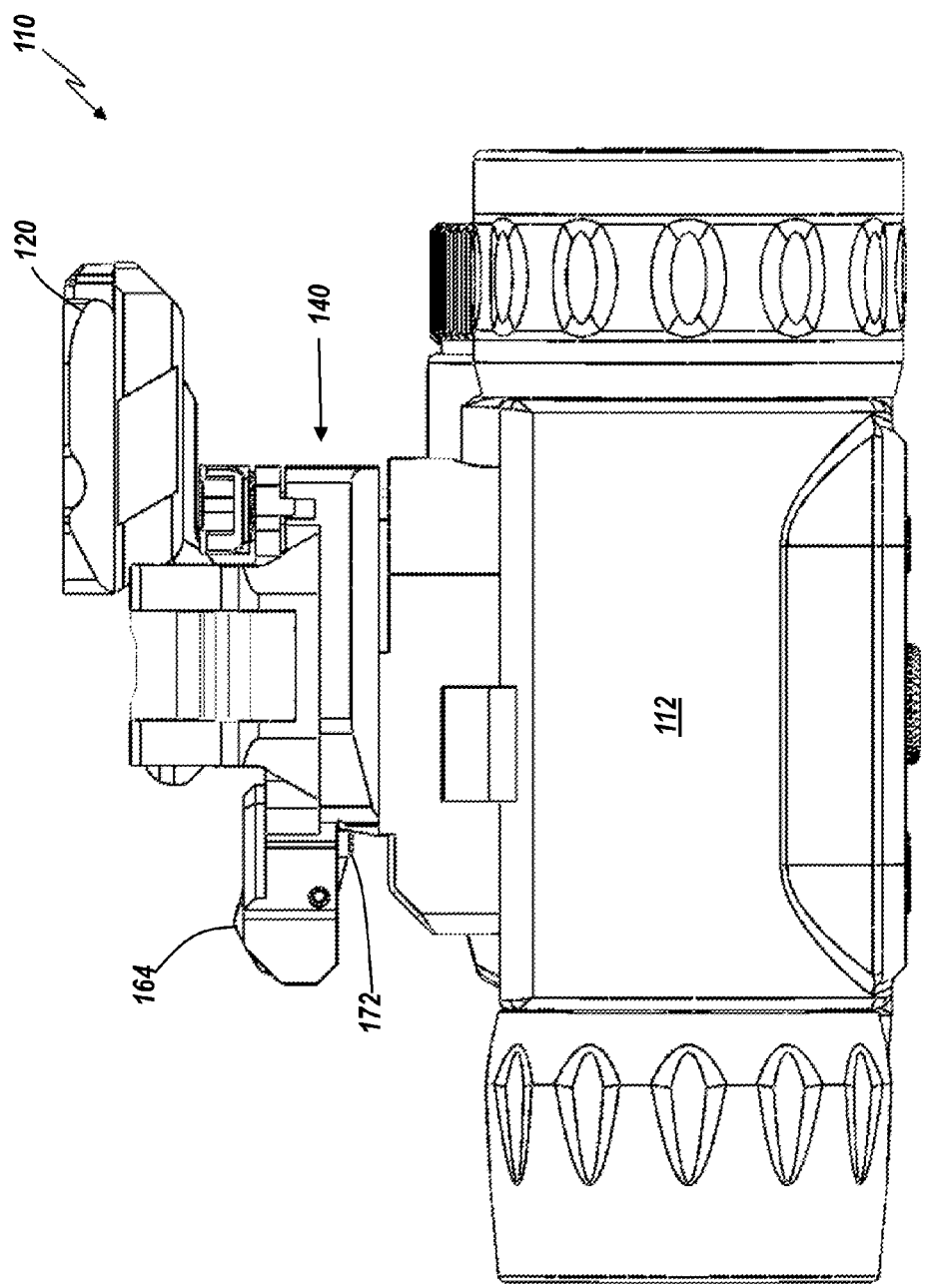
FIG. 11 is a side view illustration of the bridge mount device of FIGS. 5A-5C with optical devices, in accordance with the second exemplary embodiment of the present disclosure.

FIGS. 7A-7B are top views of an alignment of the bridge mount device 110 of FIGS. 5A-5C, in accordance with the second exemplary embodiment of the present disclosure. FIG. 7A illustrates the optical devices 112 as optical monoculars having a 1° offset from parallel alignment and with the device 110 positioned in an extended mounting position. The extended mounting position is an extended position from where the device 110 would connect to a mounting structure, such as a combat helmet, where the rail 132 of the connector 130 is extended from the shelf 134. In contrast, FIG. 7B illustrates the optical devices 112 as monoculars having a 1° offset from parallel alignment with the device in a non-extended mounting position. The non-extended mounting position is a non-extended position from where the device 110 would connect to a mounting structure, such as a combat helmet, where the rail 132 of the connector 130 is not extended from the shelf 134. The misalignment between the optical devices may be achieved by pivoting the optical devices 112 about arm fasteners 146 on either of the arms 142, 144. This misalignment may be a mechanically-designed wedged angle for convergence of a co-aligned optical monocular, which allows the use of individual monoculars to work as binoculars when the optical devices are attached to the device 110. The pivoting of the optical devices 112 to provide the convergence angle may be created using the arm removal screws 146, which control a connection of the arms 142, 144 to the shelf 134.

Figure 12:
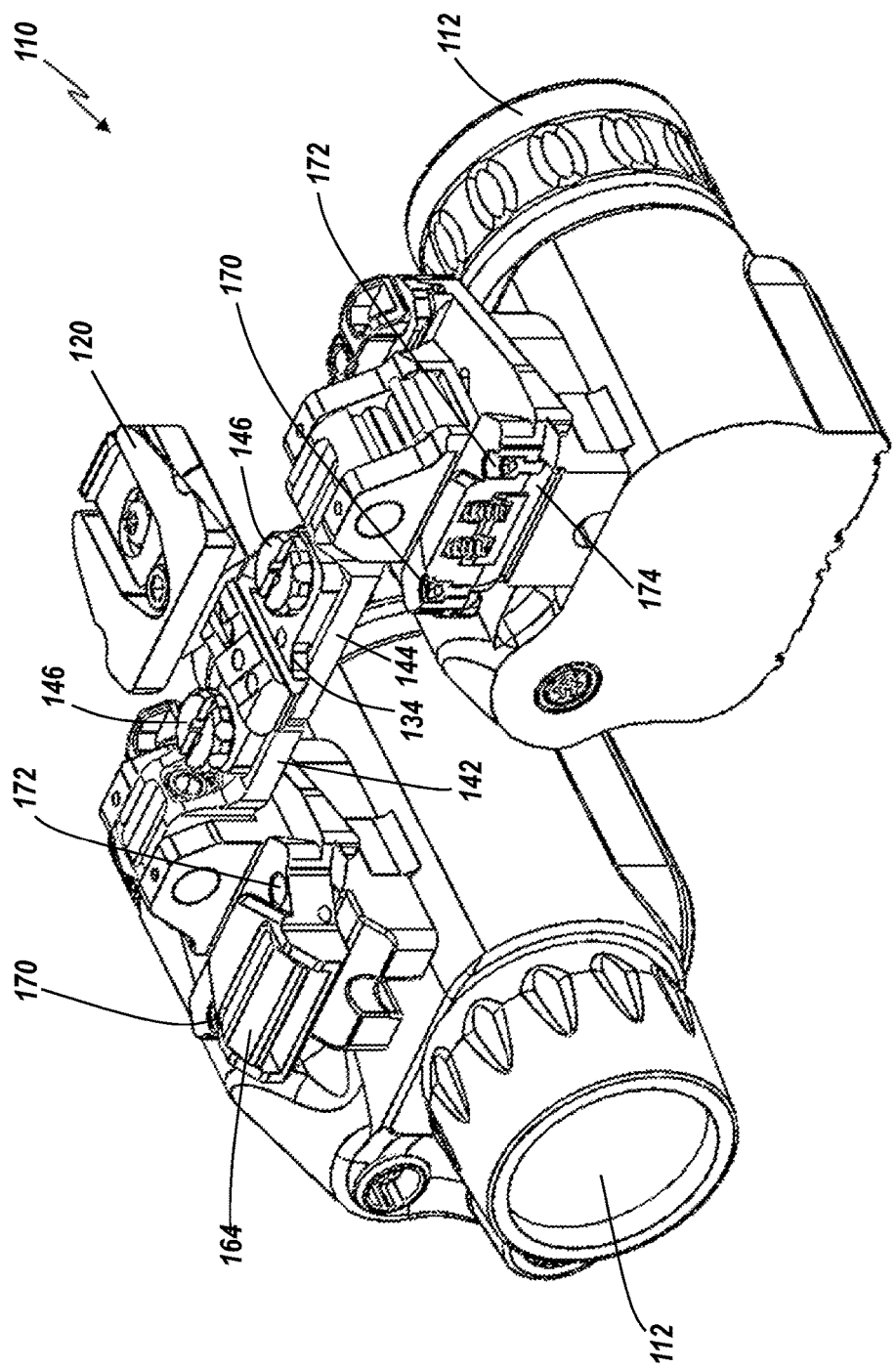
FIG. 12 is a partial cross-sectional isometric view illustration of the bridge mount device of FIGS. 5A-5C with optical devices, in accordance with the second exemplary embodiment of the present disclosure.

FIGS. 8-11 are a front view illustration, isometric view illustration, a top view illustration, and side view illustration, respectively, of the bridge mount device 110 of FIGS. 5A-5C with optical devices 112, in accordance with the second exemplary embodiment of the present disclosure. FIG. 12 is a partial cross-sectional isometric view illustration of the bridge mount device 110 of FIGS. 5A-5C with optical devices 112, in accordance with the second exemplary embodiment of the present disclosure. With reference to FIGS. 8-12, it can be seen how optical devices 112 can be retained using the bridge mount device 110, as described in FIGS. 5A-7B. One important feature of the device 110 is the use of failsafe screws 170, 172 positioned on the bridge assembly 140 on either side of the latch 164, which are used to ensure that an optical device does not inadvertently become removed from the female pocket shoe on the bridge assembly 140. Thus, the screws 170, 172 are a failsafe for ensuring that the optical device does not become removed from the bridge assembly 140 if the forward latch fails. As is shown best in FIGS. 11-12, one of the screws 172 may be positioned beyond a ceiling of the mounting shoe receiving pocket 174, e.g., female receiving pocket which receives the mounting shoe connected to the optical device 112, and engage with the male mounting shoe connected to the optical device, thereby preventing the mounting shoe from inadvertently being removed from the mounting shoe receiving pocket 174 if the latch 164 fails. The use of two screws 170, 172 may allow for one screw to be placed in a locked position (172 in FIG. 12), and another screw to be positioned in a stow position (170 in FIG. 12).

Figure 13:
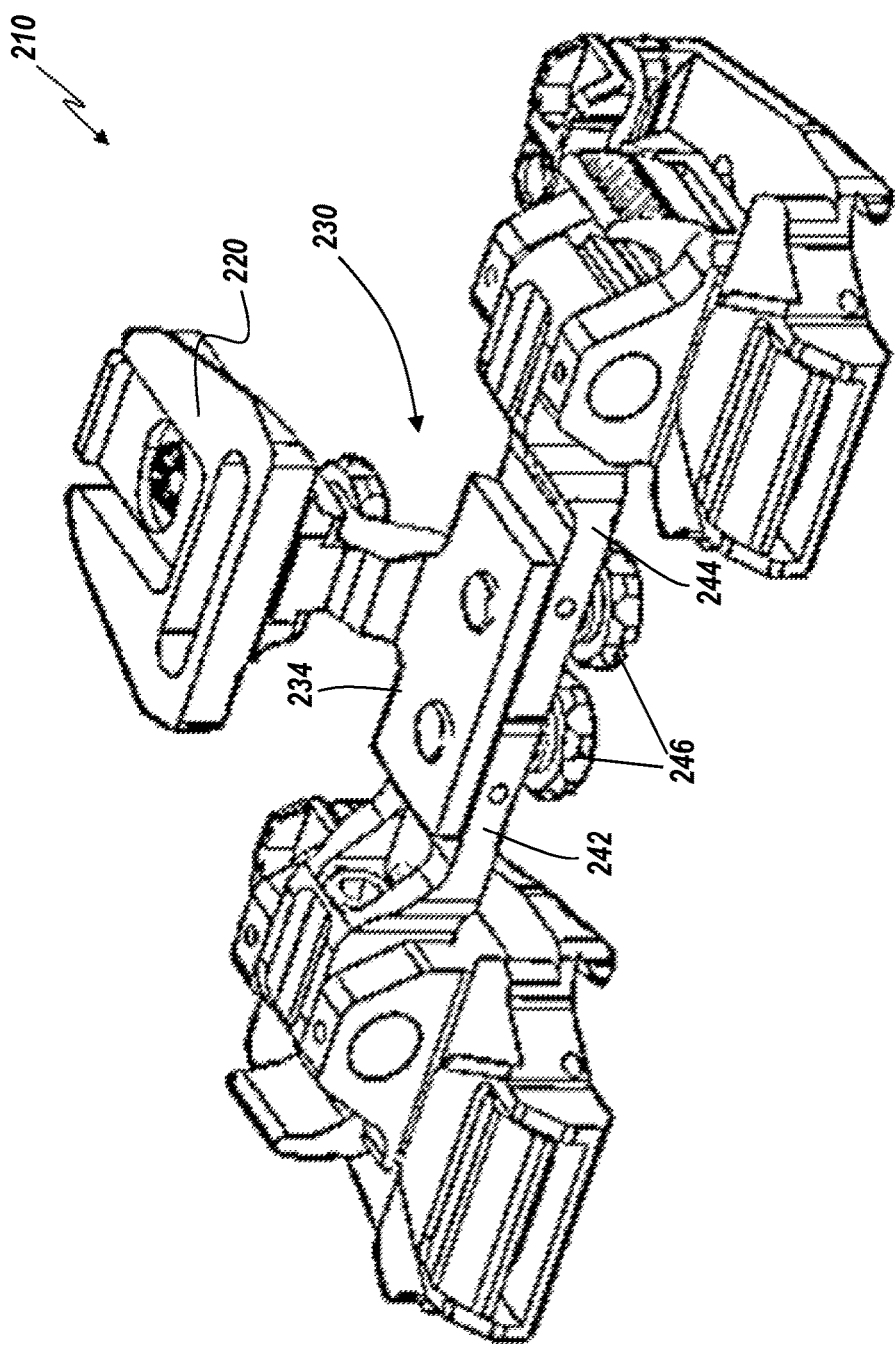
FIG. 13 is an isometric view illustration of a bridge mount device, in accordance with a third exemplary embodiment of the present disclosure.

FIG. 13 is an isometric view illustration of a bridge mount device 210, in accordance with a third exemplary embodiment of the present disclosure. The bridge mount device 210 (hereinafter referred to as 'device 210') may be substantially similar to the other bridge mount devices 10, 110 described in other embodiments of this disclosure, and it may include any of the features of any embodiment of this disclosure. Relative to the bridge mount device 110 of FIGS. 5A-12, the arm fasteners 246 of the bridge mount device 210 are connected from a bottom orientation through the arms 242, 244 and into the shelf 234, such that the arms 242, 244 connect with the underside of the shelf 234. Further, the device 210 of FIG. 13 includes a connector 230 which is substantially similar to that described in FIGS. 1-4D. Thus, unlike the non-angled connector 130 in FIGS. 5A-12, the connector 230 of FIG. 13 may include an angled leg which vertically spaces the mounting shoe 220 from the shelf 234. Mounting the arms 242, 244 from the bottom of the shelf 234 may reduce weight of the device 210 overall. Of further note, a forward and aft adjustment slide may be included with the device. While the device 210 of FIG. 13 illustrates one conception, other designs and geometries of the device 210 may be used as well, all of which are considered within the scope of the present disclosure.

Figure 14:
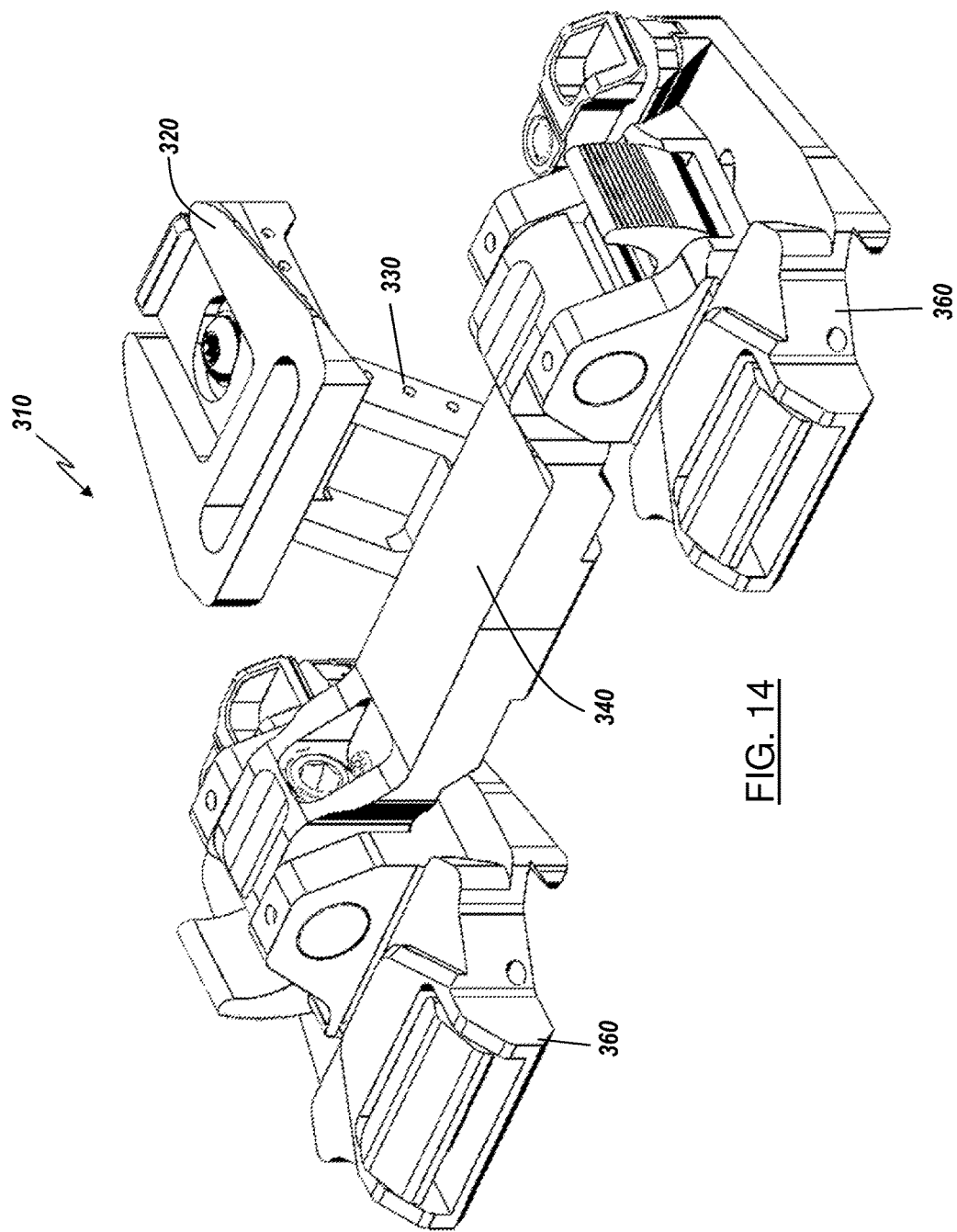
FIG. 14 is an isometric view illustration of a bridge mount device, in accordance with a fourth exemplary embodiment of the present disclosure.

FIG. 14 is an isometric view illustration of a bridge mount device 310, in accordance with a fourth exemplary embodiment of the present disclosure. The bridge mount device 310 (hereinafter referred to as 'device 310') may be substantially similar to the other bridge mount devices 10, 110, 210 described in other embodiments of this disclosure, and it may include any of the features of any embodiment of this disclosure. The device 310 includes a mounting shoe 320. A connector 330 is affixed to the mounting shoe 320. A bridge assembly 340 has a single bridge which is not detachably connected to the connector 330. Distal ends of the single bridge assembly 340 have an optical device mount 360. Relative to the other embodiments of this disclosure, the device 310 differs in that it has a single bridge assembly 340 which is not detachable from the connector 330.

FIGS. 15A-15B are isometric and top views of a bridge mount device 410 with adjustment mechanism 480, in accordance with any of the exemplary embodiments of the present disclosure. As shown, the device 410 may be substantially similar to the devices disclosed with respect to any of the embodiments of this disclosure, and therefore, may include any of the features and/or structures disclosed with respect to any embodiment of this disclosure. The device 410 includes an adjustment mechanism 470 which can be used to adjust the distance between the optical device mounts 460, thereby allowing the user to adjust the device 410 for various interpupillary distances of users. The adjustment mechanism 470 includes a threaded rod 472 which carries at least one thumb wheel 474 thereon. The threaded rod 472 may be stationary within the optical device mounts 460, secured with a set screw 473, and the at least one thumb wheel 474 may be rotatable on the threaded rod 472, whereby, rotation of the thumb wheel 474 moves allows the thumb wheel 474 to move laterally on the threaded rod 472, as shown by the arrows in FIG. 15B.

In FIGS. 15A-15B, a dual thumb wheel sandwiching a center portion is illustrated. A center attachment arm 476 is positioned on an upper portion of pivot connection 478 and is contacted by the at least one thumb wheel 474. In the dual thumb wheels, as illustrated, the center attachment arm 476 may be carried between the two thumb wheels 474. As the thumb wheels 474 are rotated and moved laterally, the optical device mount 460 may be moved laterally relative to the pivot connection 478 (or comparable structure on the bridge assembly 440). Accordingly, by rotating the thumb wheel 474, the center attachment arm 476 which is engaged with the center portion between the dual thumb wheels 474, moves female shoe receptacle 462 on the optical device mount 460 either left and right for interpupillary adjustments.

FIGS. 15C-31B are various illustrations of the bridge mount device of the embodiments herein, some of which depict the bridge mount device being used with optical devices and mounting structures illustrated as combat helmets. While the figures are described with respect to the bridge mount device 10 of the first exemplary embodiment, it is noted that the features described in FIGS. 15C-31B may be used with any of the embodiments of this disclosure.

FIGS. 15C-15D are front side views of an adjustment of a bridge mount device 10, in accordance with any of the exemplary embodiments of the present disclosure. The figures illustrate the varying interpupillary adjustments that can be made to the device 10, either using the optic left/right locking tab 66 and a slot and guide structure 68 (FIGS. 1-2D), the adjustment mechanism 470 (FIGS. 15A-15B), or another means for adjustment. As can be seen in FIG. 15C, the device 10 may have a wide adjustment, 78 mm for example, allowing the optical devices (not shown) to be moved apart further than the narrow adjustment of 52 mm, for example, shown in FIG. 15D. The device 10 may allow the operator of the device 10 to control the distance between the two optical device mounts 60 and the optical devices they carry, such as, for example, to match a distance between the user's eyes.

Figure 16C:
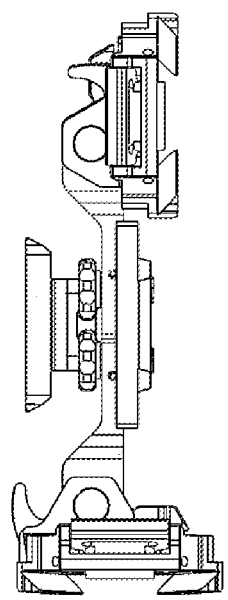
FIGS. 16A-16D are front side views of varied positioning of a bridge mount device, in accordance with any of the exemplary embodiments of the present disclosure.
Figure 16D:
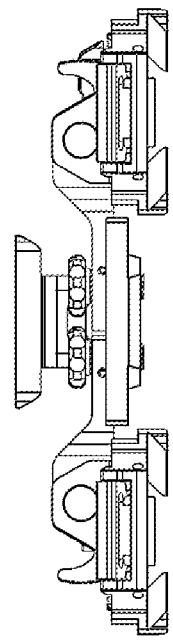
Figure 16A:
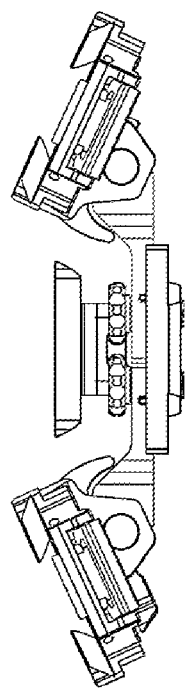
Figure 16B:
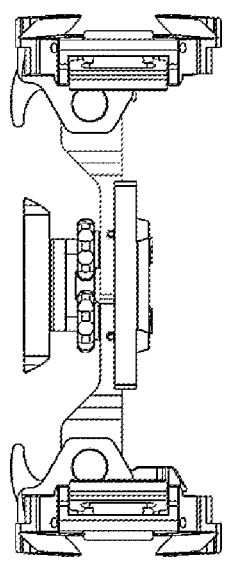
Figure 18A:
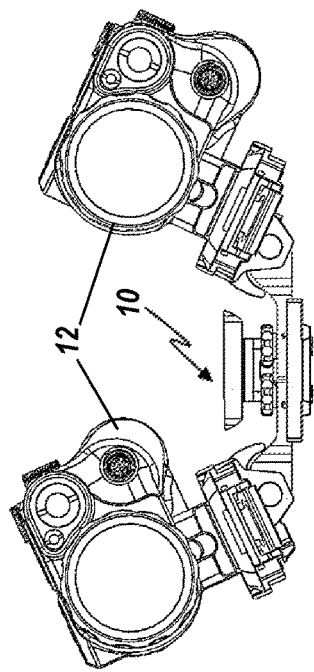
Figure 18B:
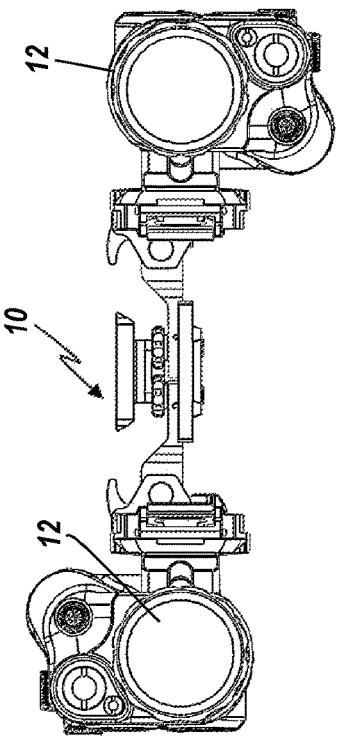
Figure 17A:
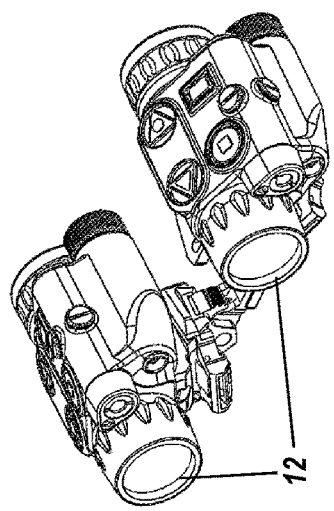
FIGS. 17A-17D are isometric views corresponding to FIGS. 18A-18D, respectively, which are front side views of positioning of a bridge mount device, in accordance with any of the exemplary embodiments of the present disclosure.
Figure 17B:
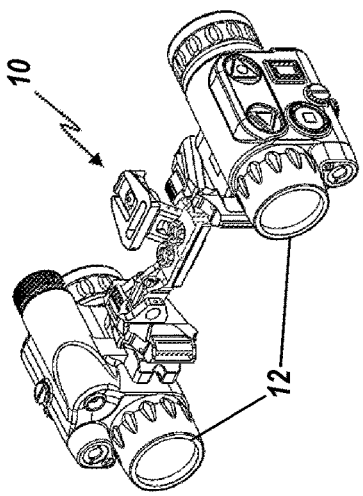
Figure 18C:
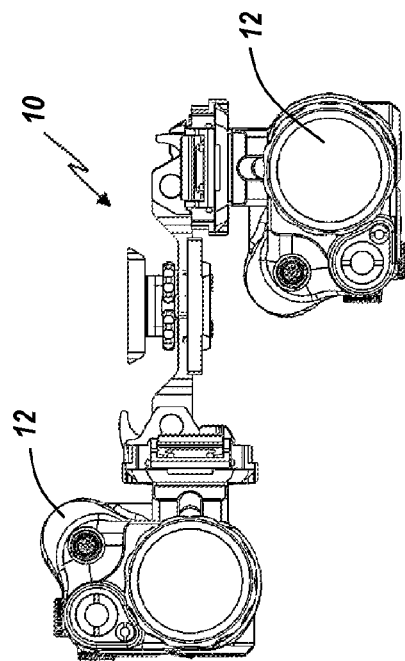
Figure 18D:
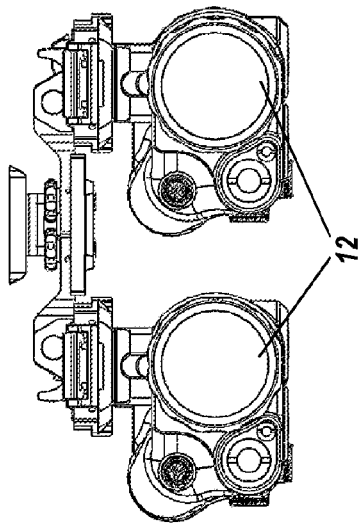
Figure 17C:
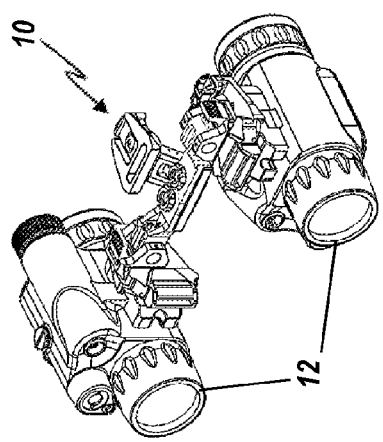
Figure 17D:
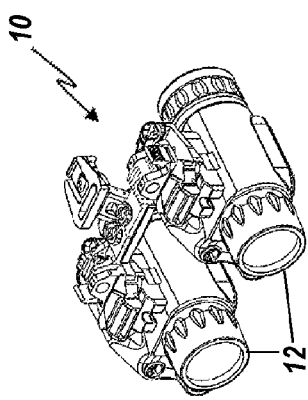

FIGS. 16A-16D are front side views of positioning of a bridge mount device, in accordance with any of the exemplary embodiments of the present disclosure. As is shown, FIG. 16A illustrates the position where the optical device (not shown) would be stowed up when not in use. In this position, the optical device mounts 60 are facing upwards (towards the upper surface of the mounting shoe 20), which would position the optical devices at or above the operator's forehead. In FIG. 16B, the optical device mounts 60 are positioned in a 90° stowed position, to the sides of the device 10, which would position the optical devices to the left and right of the operator's head. In FIG. 16C, one optical device mount 60 is positioned in the in-use position, where the optical device would be positioned proximate to the user's eye, whereas the other optical device mount 60 is positioned in a 90° stowed position. In FIG. 16D, the optical device mounts 60 are both positioned in the in-use position, placing the optical devices in front of the user's eyes. FIGS. 17A-17D are isometric views corresponding to FIGS. 18A-18D, which are front side views of positioning of a bridge mount device, in accordance with any of the exemplary embodiments of the present disclosure. These figures illustrate the positions discussed relative to FIGS. 16A-16D, but showing optical devices 12 mounted to the device 10.

Figure 19A:
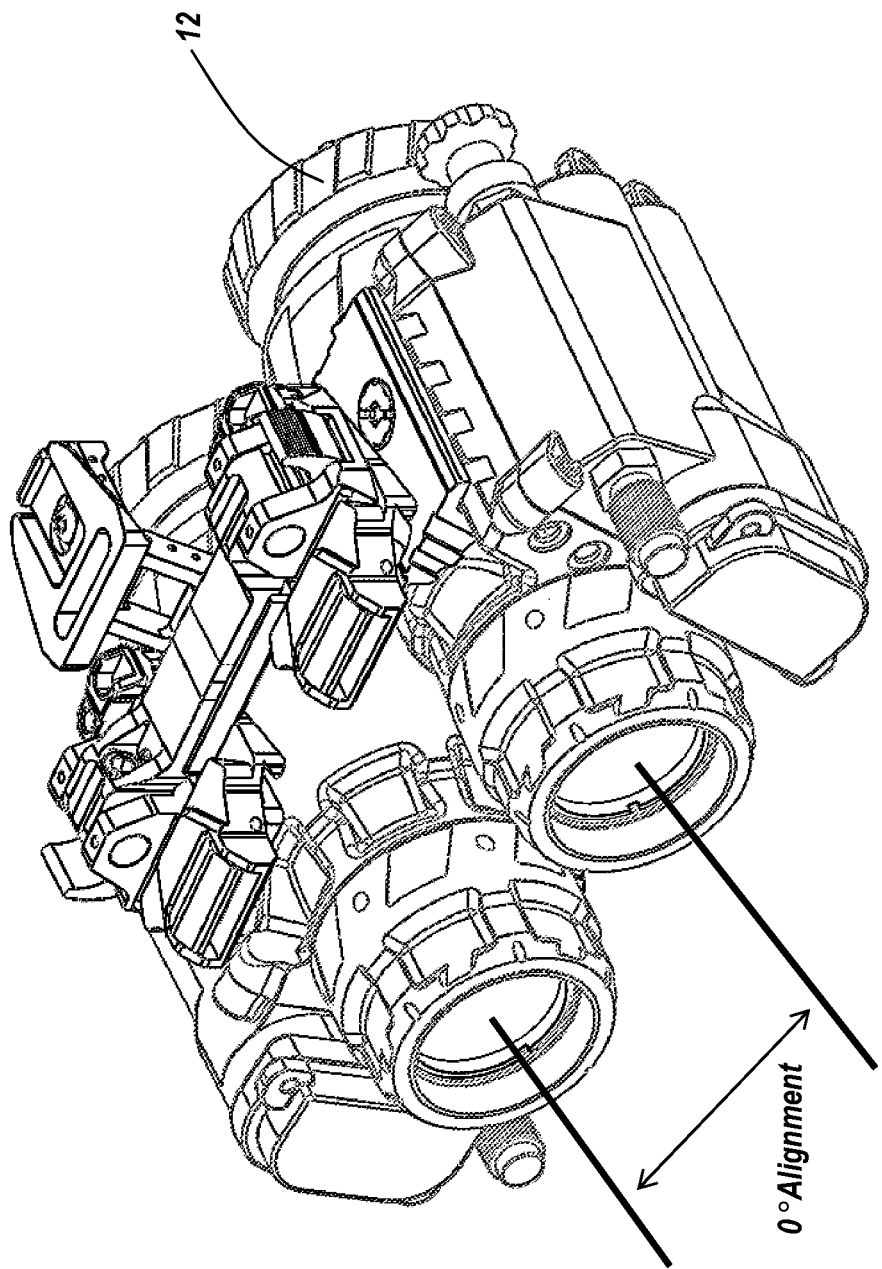

FIGS. 19A-19B are isometric and top views, respectively, of an alignment of a bridge mount device, in accordance with any of the exemplary embodiments of the present disclosure. FIG. 19A illustrates the optical devices 12 as optical monoculars in co-alignment. FIG. 19B illustrates the optical devices 12 as monoculars having a 1° offset from parallel alignment. This misalignment may be a mechanically designed wedged angle for convergence of a co-aligned optical monocular, which allows the use of individual monoculars to work as binoculars when the optical devices are attached to the device 10.

Figure 20B:
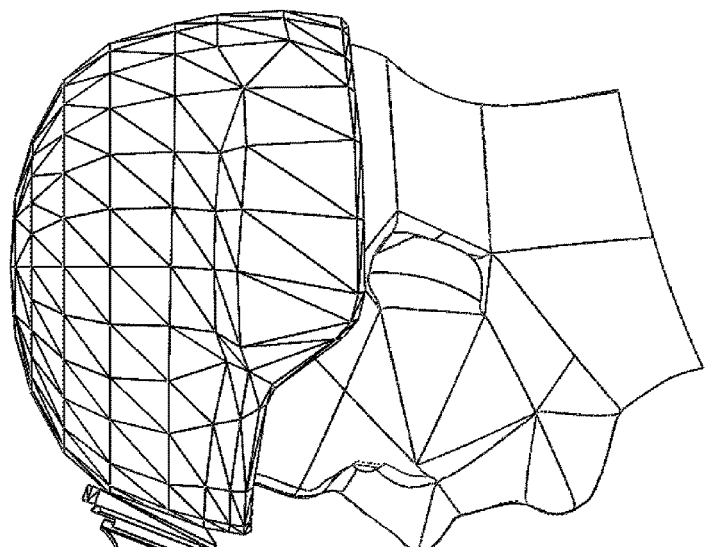
Figure 20A:
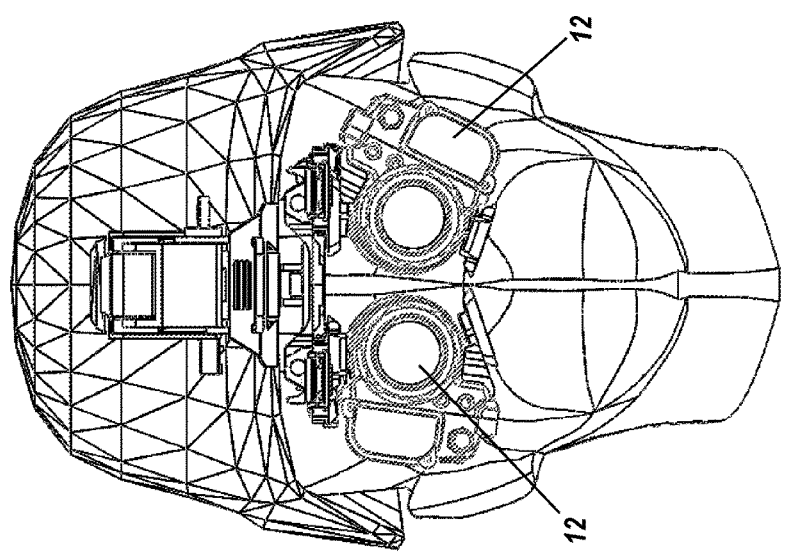
Figure 21B:
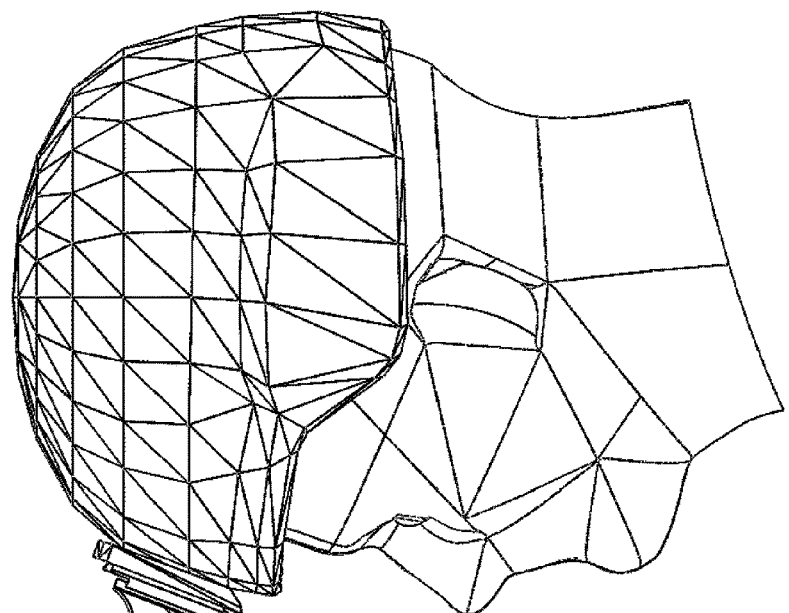
Figure 21A:
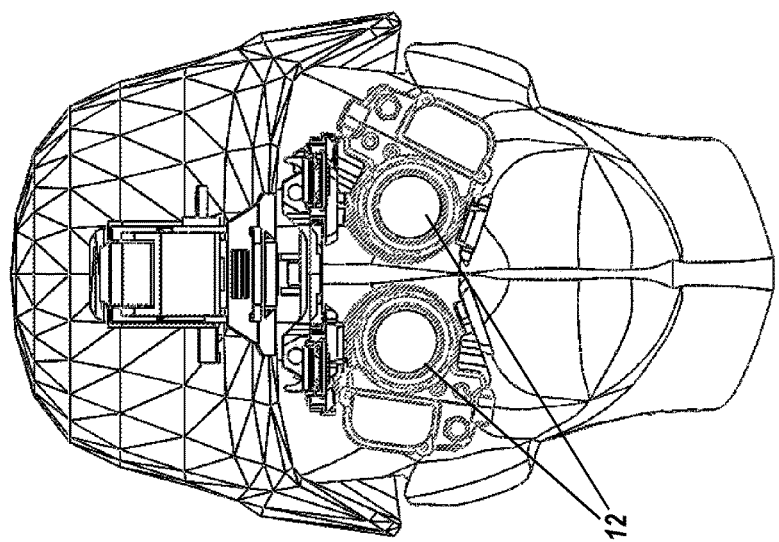
Figure 23A:
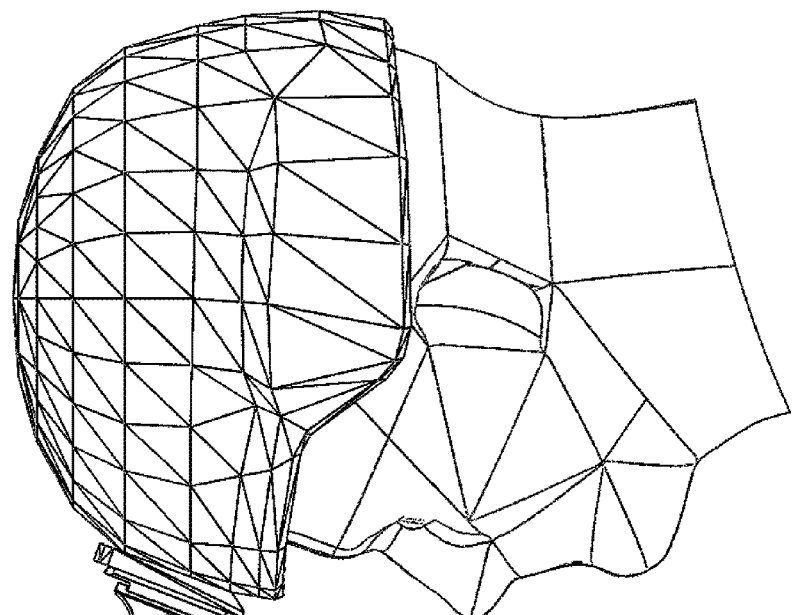
Figure 23B:
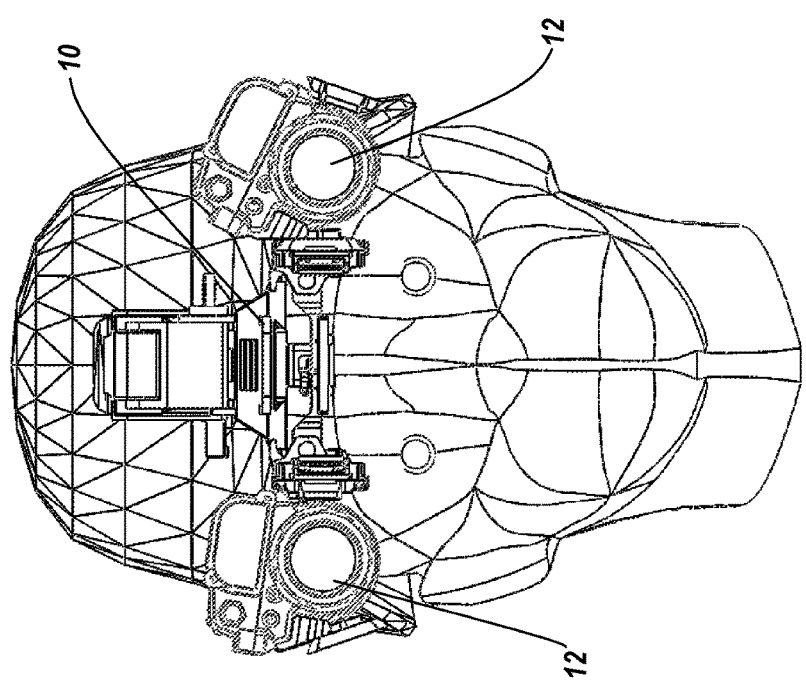

FIGS. 20A-23B are corresponding front and side views, respectively, of positioning of an optical device with a bridge mount device, in accordance with the first exemplary embodiment of the present disclosure. Shown throughout the figures are positions of the optical device 12 that are provided by the device 10. For example, FIGS. 20A-B illustrates the optical devices 12 positioned in-use, in front of the user's eyes, where the device 10 is extending on the helmet mounting structure 14, thereby placing the optical device 12 distant from the user's eyes. FIGS. 21A-B illustrate the optical devices 12 positioned in-use, in front of the user's eyes, where the device 10 is retracted on the helmet mounting structure 14, thereby placing the optical device 12 closer to the user's eyes. FIGS. 22A-B illustrate one optical device 12 positioned in-use, in front of the user's eyes, and another optical device 12 in a stowed, 90° position. FIGS. 23A-B illustrate both optical devices 12 positioned in a stowed, 90° position.

Figure 24B:
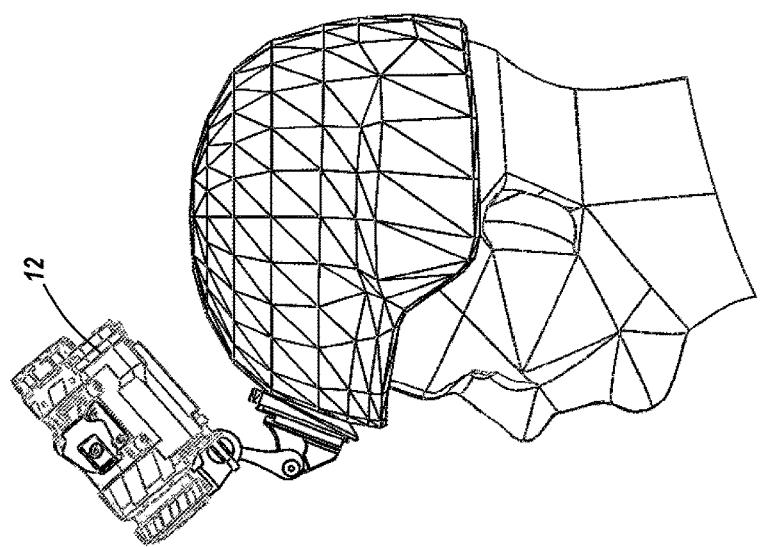
Figure 24C:
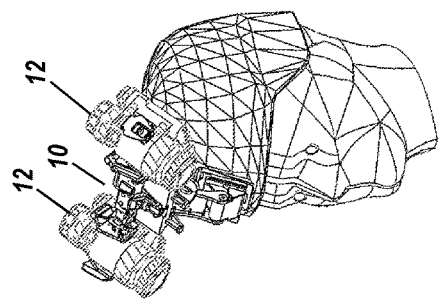
Figure 24A:
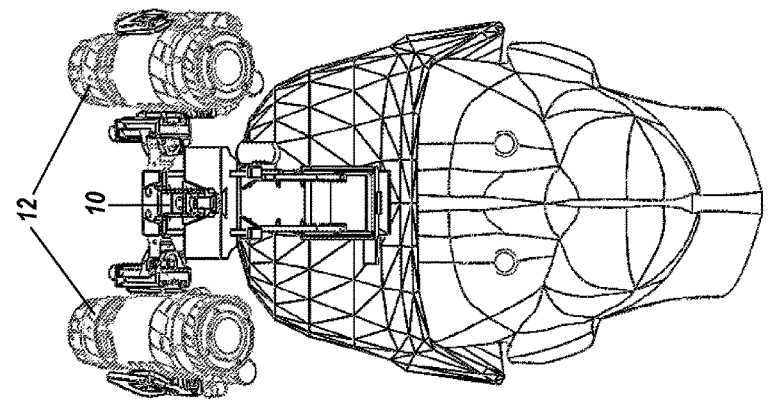
Figure 25B:
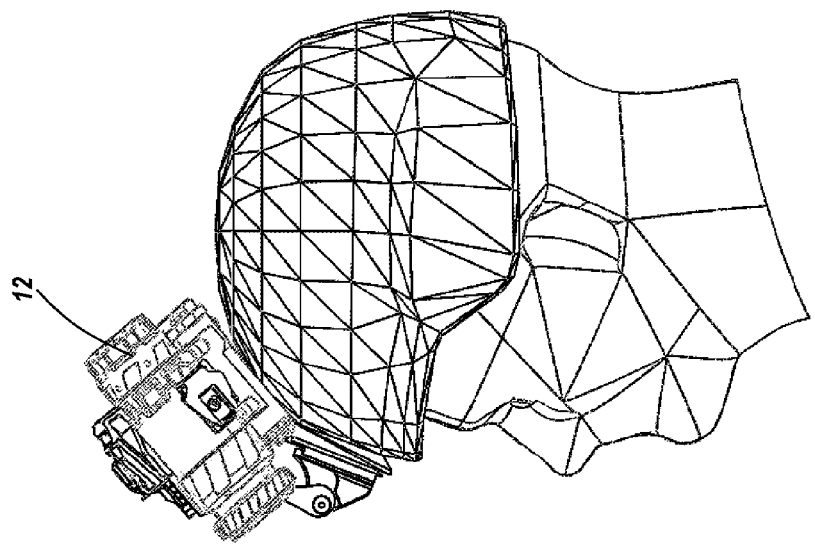
Figure 25C:
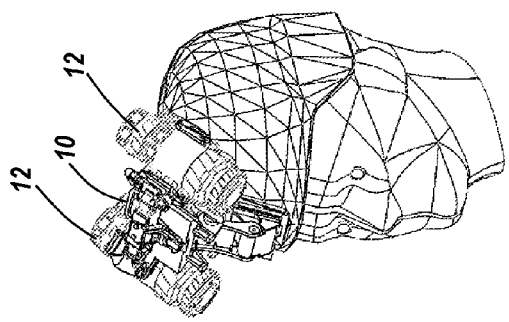
Figure 25A:
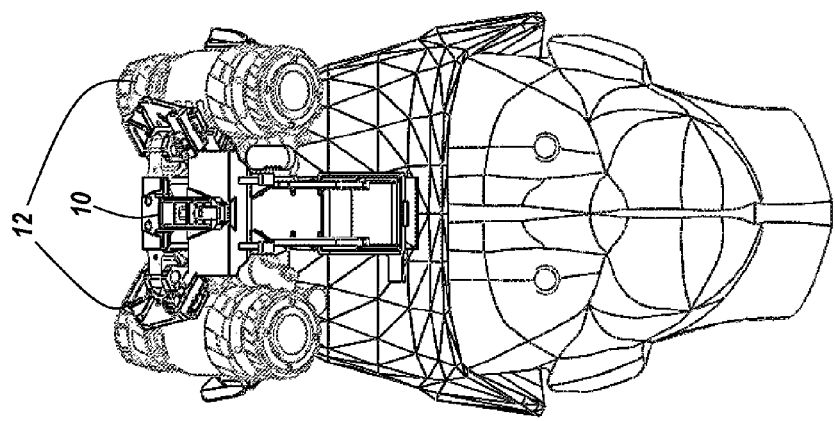
Figure 26B:
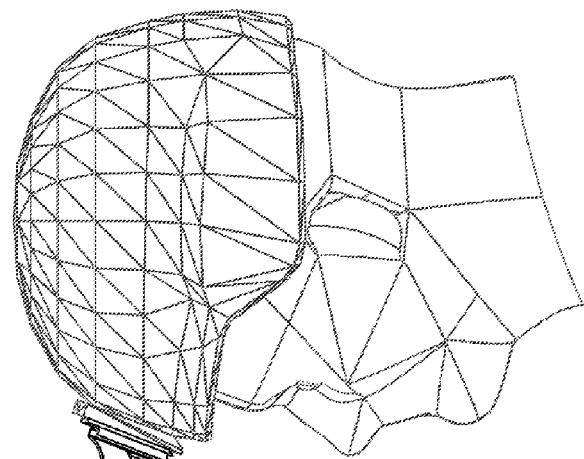
Figure 26C:
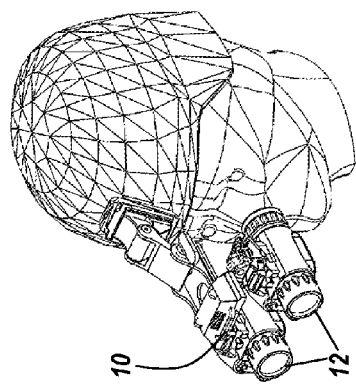
Figure 26A:
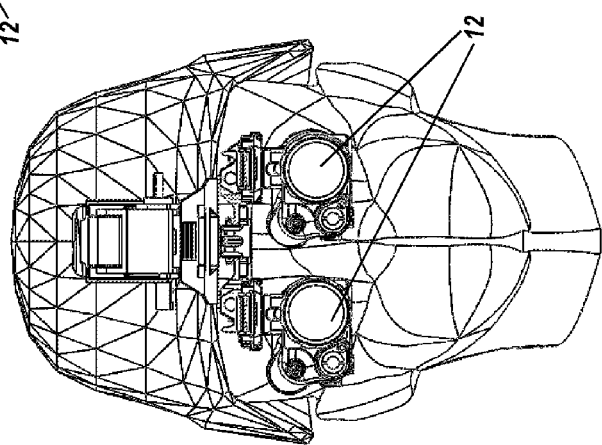
Figure 28B:
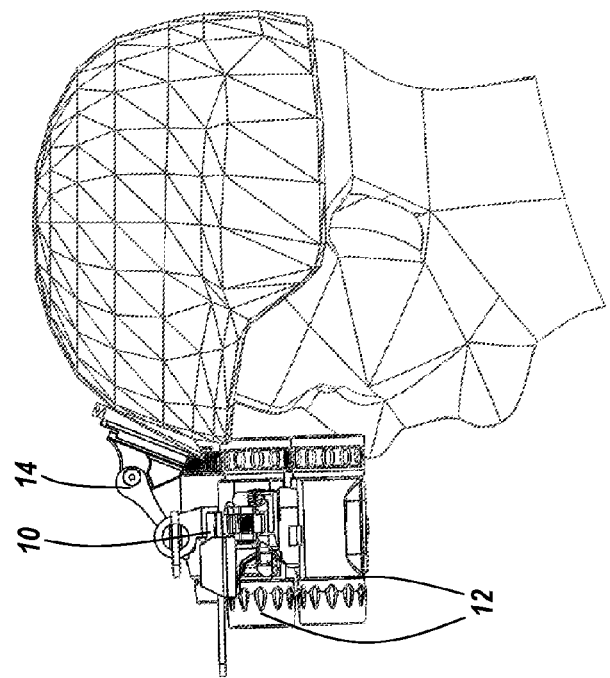
Figure 28C:
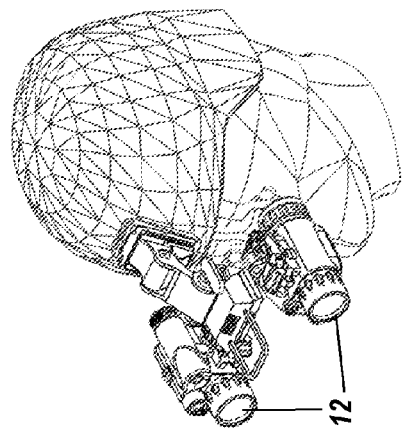
Figure 28A:
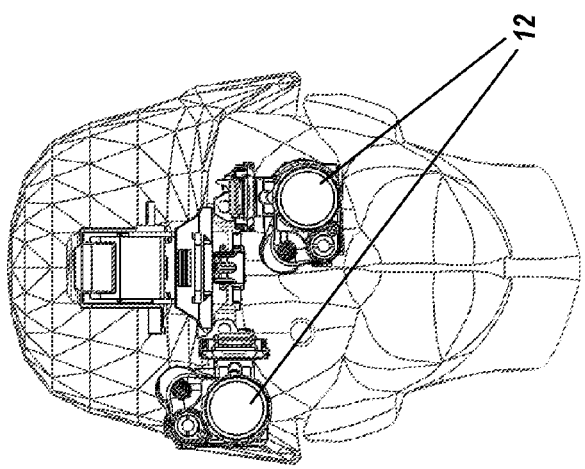
Figure 31B:
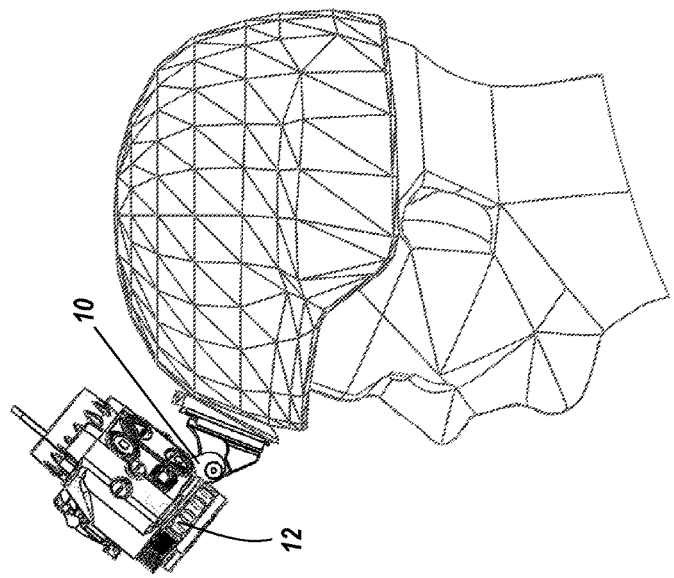
Figure 31C:
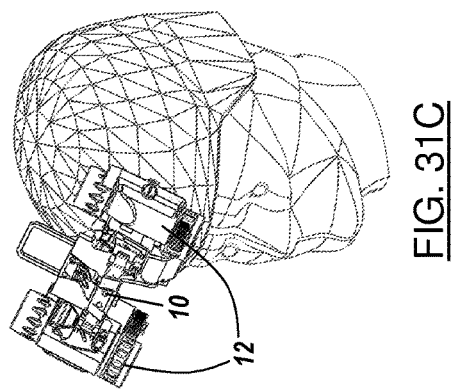
Figure 31A:
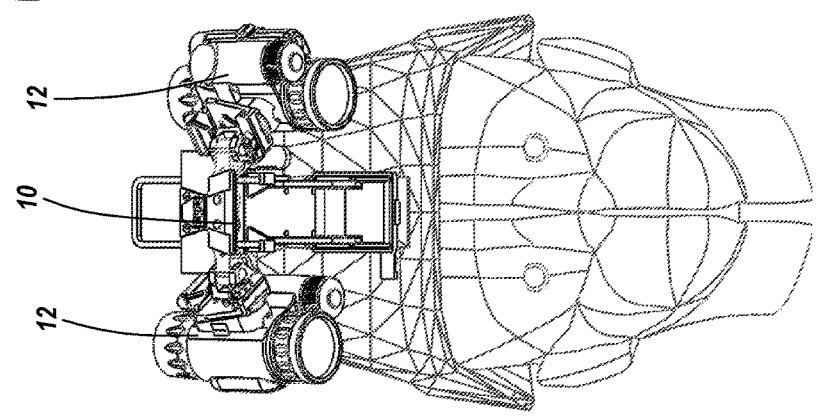

FIGS. 24A-31C are corresponding front, side, and isometric views, respectively, of positioning of an optical device with a bridge mount device, in accordance with any exemplary embodiment of the present disclosure. Shown throughout the figures are positions of the optical device 12 that are provided by the device 10 discussed relative to FIGS. 4A-D, having an opposite-facing connector. For example, FIGS. 24A-C illustrate both optical devices 12 in the in-use position on the device 10, but the entire assembly positioned in a vertically-retracted position, whereby the optical devices 12 are positioned near or above the user's forehead. FIGS. 25A-C illustrate both optical devices 12 in the stowed position on the device 10, but the entire assembly positioned in a vertically-retracted position, whereby the optical devices 12 are positioned near or above the user's forehead. FIGS. 26A-C illustrate the optical devices 12, as a smaller thermal viewer, positioned in-use, in front of the user's eyes, where the device 10 is extending on the helmet mounting structure 14, thereby placing the optical device 12 distant from the user's eyes. FIGS. 27A-C illustrate the optical devices 12 positioned in-use, in front of the user's eyes, where the device 10 is retracted on the helmet mounting structure 14, thereby placing the optical device 12 closer to the user's eyes. FIGS. 28A-C illustrate one optical device 12 positioned in-use, in front of the user's eyes, and another optical device 12 in a stowed, 90° position. FIGS. 29A-C illustrate both optical devices 12 positioned in a stowed, 90° position. FIGS. 30A-C illustrate both optical devices 12 in the in-use position on the device 10, but the entire assembly positioned in a vertically-retracted position, whereby the optical devices 12 are positioned near or above the user's forehead. FIGS. 31A-C illustrate both optical devices 12 in the stowed position on the device 10, but the entire assembly positioned in a vertically-retracted position, whereby the optical devices 12 are positioned near or above the user's forehead.

Figure 32:
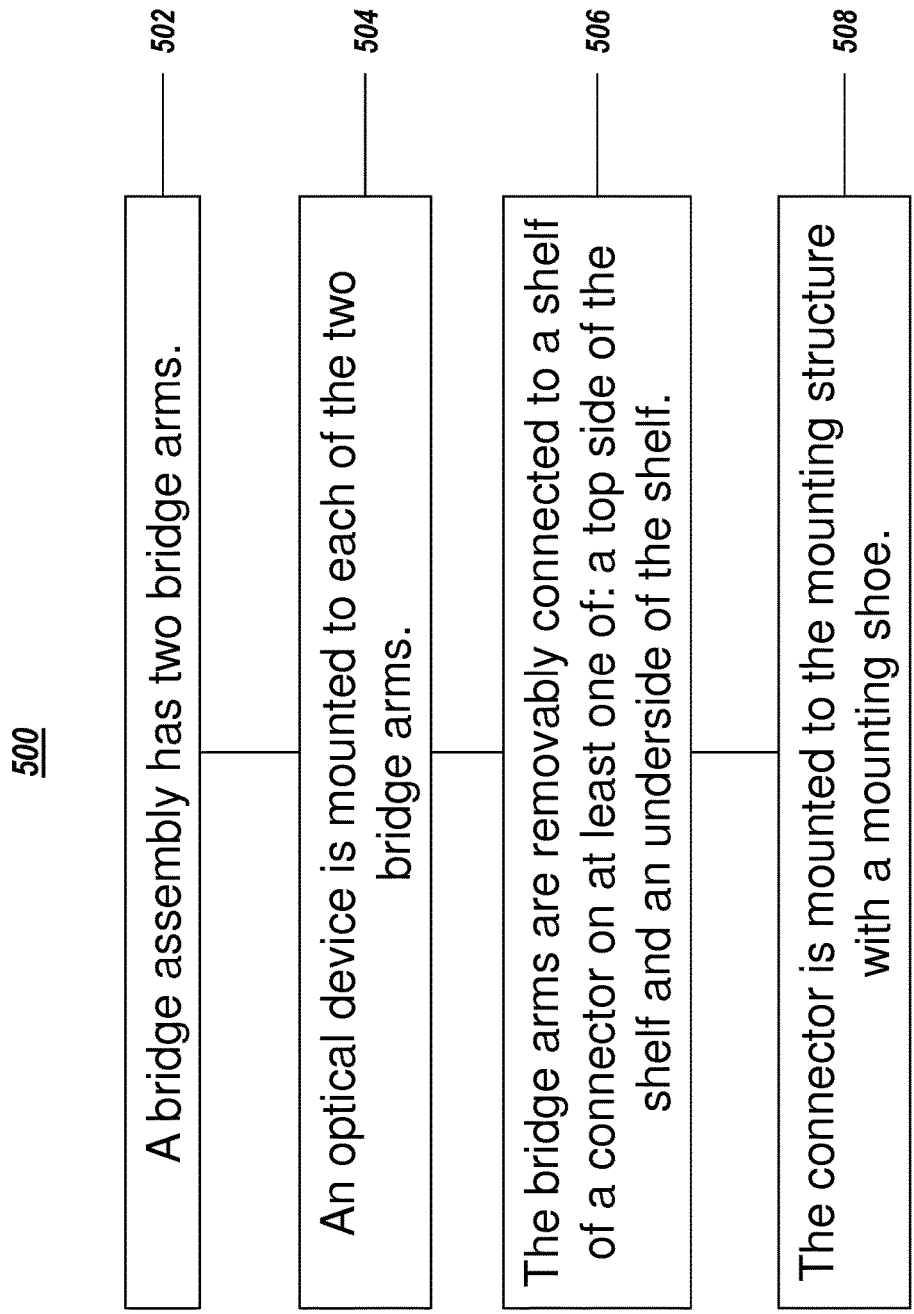
FIG. 32 is a flowchart illustrating a method of mounting an optical device to a mounting structure, in accordance with any exemplary embodiment of the disclosure.

FIG. 32 is a flowchart 500 illustrating a method of mounting an optical device 510 to a mounting structure, in accordance with any exemplary embodiment of the present disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 502, a bridge assembly having two bridge arms is provided. An optical device is mounted to each of the two bridge arms (block 504). The bridge arms are removably connected to a shelf of a connector on at least one of: a top side of the shelf and an underside of the shelf (block 506). The connector is mounted to the mounting structure with a mounting shoe (block 508). The method may further include any of the structures, features, or functions described with respect to any embodiment of this disclosure.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A bridge mount device comprising:
a mounting shoe having dovetail-angled sides forming a width thereof;
a connector affixed to the mounting shoe;
a shelf affixed to the connector, the shelf having a width exceeding the width of the mounting shoe, wherein the shelf has top side and an underside, wherein at least one of the top side and the underside has a substantially planar shelf engagement surface; and
a bridge assembly having at least two bridge arms, each having an optical device mount, wherein the at least two bridge arms are detachably connected to the shelf through contact with the substantially planar shelf engagement surface of the at least one of the top side and the underside of the shelf, and wherein the mounting shoe is vertically and horizontally offset from the bridge assembly.

2. The bridge mount device of claim 1, wherein each of the at least two bridge arms has an optical device mount.

3. The bridge mount device of claim 1, wherein the connector further comprises an angled leg, wherein the angled leg extends between the shelf and the mounting shoe at a non-perpendicular angle.

4. The bridge mount device of claim 1, wherein the at least two bridge arms are detachably connected to the substantially planar surface of the top side of the shelf.

5. The bridge mount device of claim 1, wherein the at least two bridge arms are detachably connected to the substantially planar surface of the underside of the shelf.

6. The bridge mount device of claim 1, wherein the shelf further comprises at least one guide positioned on at least one of a forward and a backward edge of the shelf, wherein the at least one guide orients the at least two bridge arms to the shelf.

7. The bridge mount device of claim 1, further comprising at least one arm removal fastener removably affixing at least one bridge arm of the at least two bridge arms to the shelf.

8. The bridge mount device of claim 1, wherein each of the at least two bridge arms further comprises a pivot connection, wherein the optical device mount of each bridge arm is rotatable about the pivot connection, wherein a pivot force adjustment fastener is positioned at least partially in the pivot connection, wherein the pivot force adjustment fastener controls a pivot force of the pivot connection.

9. The bridge mount device of claim 8, further comprising a locking latch engagable with the pivot connection, wherein the locking latch locks the pivot connection in a nonrotatable state.

10. The bridge mount device of claim 1, wherein the optical device mount of each bridge arm is movable in a lateral direction relative to the bridge arm.

11. The bridge mount device of claim 10, wherein a distance between a first optical device mount on a first bridge arm and a second optical device mount on a second bridge arm is adjustable.

12. The bridge mount device of claim 11, further comprising a guide structure controlling movement of the optical device mount in the lateral direction.

13. The bridge mount device of claim 12, wherein a locking tab controls a frictional state of the guide structure to control a movement of the optical device mount in the lateral direction.

14. The bridge mount device of claim 1, wherein the mounting shoe is horizontally offset from the bridge assembly with a front edge of the mount shoe facing the bridge assembly, wherein the front edge of the mounting shoe has a smaller width than a rear edge of the mounting shoe.

15. The bridge mount device of claim 1, wherein the mounting shoe is horizontally offset from the bridge assembly with a rear edge of the mount shoe facing the bridge assembly, wherein a front edge of the mounting shoe has a smaller width than the rear edge of the mounting shoe.

16. A bridge mount device comprising:
a mounting shoe having dovetail-angled sides forming a width thereof;
a connector affixed to the mounting shoe; and
a bridge assembly having at least two bridge arms, each having an optical device mount, wherein the at least two bridge arms are detachably connected to the connector, and wherein the mounting shoe is horizontally adjustable from the bridge assembly.

17. The bridge mounting device of claim 16, wherein the connector further comprises a rail and a shelf, wherein the rail is positioned between the mounting shoe and the shelf, wherein the mounting shoe is adjustable along a length of the rail.

18. The bridge mounting device of claim 17, wherein the rail is rotatable relative to the shelf.

19. The bridge mounting device of claim 17, wherein the rail has a portion with a slot formed therein, wherein the slot is substantially parallel to the length of the rail, wherein the mounting shoe is movably mounted to the slot.

20. The bridge mounting device of claim 16, further comprising an arm fastener connecting each of the bridge arms to the connector, wherein each of the bridge arms is rotatable about the arm fastener.

21. The bridge mounting device of claim 20, wherein an optical alignment of optical devices carried on each of the bridge arms, respectively, is controlled with the arm fastener for each of the bridge arms.

22. An optical device bridge mount device comprising:
   a mounting shoe;
   a connector affixed to the mounting shoe; and
   a bridge assembly having at least two bridge arms, each bridge arm having an optical device mount with an optical device connected thereto; and
   a fastener connecting each bridge arm to the connector, wherein an alignment of optical paths of the optical devices is adjustable.

23. The bridge mount device of claim 1, wherein each of the at least two bridge arms have ends which substantially interconnect with one another when the at least two bridge arms are connected to the shelf.

\* \* \* \* \*